United States Patent
Zhang et al.

(10) Patent No.: US 12,519,317 B2
(45) Date of Patent: Jan. 6, 2026

(54) POWER SUPPLY SYSTEM, PROTECTION METHOD FOR POWER SUPPLY SYSTEM, AND DC/DC CONVERTER

(71) Applicant: Huawei Digital Power Technologies Co., Ltd., Shenzhen (CN)

(72) Inventors: Yanzhong Zhang, Shenzhen (CN); Song Wan, Shanghai (CN); Hongmiao Fang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/410,092

(22) Filed: Jan. 11, 2024

(65) Prior Publication Data
US 2024/0146069 A1    May 2, 2024

Related U.S. Application Data

(63) Continuation of application No. PCT/CN2021/105794, filed on Jul. 12, 2021.

(51) Int. Cl.
*H02J 3/38* (2006.01)
*H02J 3/00* (2006.01)

(52) U.S. Cl.
CPC .......... *H02J 3/388* (2020.01); *H02J 3/0012* (2020.01); *H02J 3/381* (2013.01); *H02J 2300/24* (2020.01)

(58) Field of Classification Search
CPC .......... H02J 3/0012; H02J 3/381; H02J 3/388; H02J 2300/24
USPC .......................................................... 307/43
See application file for complete search history.

(56) References Cited

U.S. PATENT DOCUMENTS 9,397,494 B2    7/2016    Hofheinz et al.
10,505,437 B2   12/2019   Tsai et al.

FOREIGN PATENT DOCUMENTS

| | | |
|---|---|---|
| AU | 2008201173 B2 | 7/2010 |
| CN | 202906486 U | 4/2013 |
| CN | 109167390 A | 1/2019 |
| CN | 111245021 A | 6/2020 |
| CN | 112636694 A | 4/2021 |
| EP | 1936772 B1 | 10/2013 |
| WO | 2021000253 A1 | 1/2021 |

OTHER PUBLICATIONS

IEC 62109-2, Safety of power converters for use in photovoltaic power systems, Part 2: Particular requirements for inverters, International Standard, Norme Internationale, Edition 1.0 Jun. 2011, total 68 pages.

*Primary Examiner* — Hal Kaplan
(74) *Attorney, Agent, or Firm* — Slater Matsil, LLP

(57) ABSTRACT

A power supply system includes at least one group of power supply modules. The power supply module includes a first string, a first residual current detection circuit, an inverter circuit, and a first controller. The first residual current detection circuit is connected between the first string and an input end of the inverter circuit, and an output end of the inverter circuit is connected to an alternating current power grid. When a first residual current value detected by the first residual current detection circuit is greater than a first preset residual current threshold, the first controller controls the first string to be disconnected from the inverter circuit, or controls the inverter circuit to be disconnected from the alternating current power grid.

19 Claims, 13 Drawing Sheets

POWER SUPPLY SYSTEM, PROTECTION METHOD FOR POWER SUPPLY SYSTEM, AND DC/DC CONVERTER

CROSS-REFERENCE TO RELATED APPLICATIONS

This application is a continuation of International Application No. PCT/CN2021/105794, filed on Jul. 12, 2021, the disclosure of which is hereby incorporated by reference in its entirety.

TECHNICAL FIELD

This application relates to the field of power supply technologies, and in particular, to a power supply system, a protection method for a power supply system, and a DC/DC converter.

BACKGROUND

If there is an excessively high residual current (namely, a leakage current) in a power supply system, normal running of the power supply system is affected, and even a housing of a device (for example, an inverter) in the power supply system is energized, which poses a threat to personal safety of an onsite worker.

A power supply system shown in FIG. 1a includes a plurality of photovoltaic strings, a combiner box, and an inverter. Each photovoltaic string is connected to an input end of the inverter by using a combiner box connected to the photovoltaic string, and an output end of the inverter is connected to an alternating current power grid. For the power supply system shown in FIG. 1a, a protection method for a power supply system used in the conventional technology is mainly as follows: A residual current value at the output end of the inverter is detected, and when the residual current value is greater than a preset residual current standard value, the inverter is directly disconnected from the alternating current power grid, to ensure that there is no residual current in a residual current detection circuit, so as to protect the power supply system. However, once the protection manner is triggered, the power supply system stops working. Therefore, the protection manner is not flexible enough and has poor applicability.

SUMMARY

This application provides a power supply system, a protection method for a power supply system, and a DC/DC converter, so that when a first residual current value is greater than a first residual current threshold, a first string can be controlled to be disconnected from an inverter circuit or an inverter circuit can be controlled to be disconnected from an alternating current power grid, to protect the power supply system. The protection manner is flexible and has high applicability.

According to a first aspect, this application provides a power supply system. The power supply system includes at least one group of power supply modules. The power supply module includes a first string, a first residual current detection circuit, an inverter circuit, and a first controller. The first residual current detection circuit is connected between the first string and an input end of the inverter circuit, and an output end of the inverter circuit is connected to an alternating current power grid. The first residual current detection circuit detects a first residual current value of the first string, and sends the first residual current value to the first controller. When the received first residual current value is greater than a first preset residual current threshold, the first controller controls the first string in the power supply module in which the first controller is located to be disconnected from the inverter circuit, or controls the inverter circuit in the power supply module in which the first controller is located to be disconnected from the alternating current power grid. In this way, when the first residual current value is greater than the first preset residual current threshold, it may be determined that the power supply module in which the first residual current detection circuit is located has a leakage risk, that is, the power supply module is a faulty power supply module, and the faulty power supply module in the power supply system is cut off, to protect the power supply system. The protection manner is flexible and has high applicability.

With reference to the first aspect, in a first possible implementation, the power supply module further includes a first direct current-to-direct current conversion circuit. The first string is connected to the input end of the inverter circuit by using the first direct current-to-direct current conversion circuit. The first residual current detection circuit detects a first residual current value at an output end of the first direct current-to-direct current conversion circuit. In this way, when the power supply module further includes the first direct current-to-direct current conversion circuit, the power supply system can still be protected in the manner in the foregoing aspect, and applicability is high.

With reference to the first aspect, in a second possible implementation, the power supply system further includes a second string, a second residual current detection circuit, and a second controller. The second residual current detection circuit is connected between the second string and the input end of the inverter circuit. The second residual current detection circuit detects a second residual current value of the first string or the second string, and sends the second residual current value to the second controller. When the received second residual current value is greater than a second preset residual current threshold, the second controller controls the second string to be disconnected from each group of power supply modules, or triggers a first controller in each group of power supply modules to control a first string in the power supply module in which the first controller is located to be disconnected from an inverter circuit and the inverter circuit to be disconnected from the alternating current power grid. In this way, when the second residual current value is greater than the second preset residual current threshold, it may be determined that a power supply loop or a charging loop in which the second string and the second residual current detection circuit are located has a leakage risk, that is, the power supply loop or the charging loop is a faulty residual current loop, and the faulty residual current loop is cut off, to protect the power supply system.

With reference to the first aspect, in a third possible implementation, when the power supply system includes one group of power supply modules, the power supply module further includes a third residual current detection circuit. The third residual current detection circuit detects a third residual current value at the output end of the inverter circuit, and sends the third residual current value to the first controller. When the received third residual current value is greater than a third preset residual current threshold, the first controller controls the inverter circuit to be disconnected from the alternating current power grid, or controls the first string to be disconnected from the inverter circuit. In this way, when the third residual current value is greater than the third preset residual current threshold, it may be determined that a power supply loop in which the inverter circuit and the third residual current detection circuit are located has a leakage risk, that is, the power supply loop is a faulty residual current loop, and the faulty residual current loop is cut off, to protect the power supply system.

With reference to the first aspect, in a fourth possible implementation, when the power supply system includes at least two groups of power supply modules, the power supply system further includes a system residual current detection circuit and a third controller, and the system residual current detection circuit is connected between output ends of the at least two groups of power supply modules and the alternating current power grid. The system residual current detection circuit detects a fourth residual current value at the output ends of the at least two groups of power supply modules, and sends the fourth residual current value to the third controller. When the received fourth residual current value is greater than a fourth preset residual current threshold, the third controller controls each group of power supply modules to be disconnected from the alternating current power grid, or triggers the first controller in each group of power supply modules to control the first string in the power supply module in which the first controller is located to be disconnected from the inverter circuit. In this way, when the fourth residual current value is greater than the fourth preset residual current threshold, it may be determined that a power supply loop in which the system residual current detection circuit is located has a leakage risk, that is, the power supply loop is a faulty residual current loop, and the faulty residual current loop is cut off, to avoid a case in which in an existing solution, due to a cross current generated between at least two inverter circuits, there is detection difficulty for a residual current detection circuit located at an output end of the inverter circuit, and consequently a power supply system cannot be effectively protected.

With reference to the first aspect, in a fifth possible implementation, the power supply module further includes an insulation impedance detection circuit. The insulation impedance detection circuit is connected between the first string and the input end of the inverter circuit. The insulation impedance detection circuit detects an insulation impedance value at the input end of the inverter circuit, and sends the insulation impedance value to the first controller. When the received insulation impedance value is less than a preset insulation impedance threshold, the first controller controls the first string in the power supply module in which the first controller is located to be disconnected from the inverter circuit, or controls the inverter circuit in the power supply module in which the first controller is located to be disconnected from the alternating current power grid. In this way, when the insulation impedance value is less than the preset insulation impedance threshold, it may be determined that the power supply module is a faulty power supply module, and the faulty power supply module in the power supply system is effectively cut off, to protect the power supply system.

With reference to the first aspect, in a sixth possible implementation, the first controller includes a first subcontroller and a second subcontroller. The first subcontroller controls the first string to be disconnected from the inverter circuit, or triggers the second subcontroller to control the inverter circuit to be disconnected from the alternating current power grid. This is applicable to a case in which circuits in the power supply module are integrated into two devices (for example, a DC/DC converter and an inverter), and applicability is high.

With reference to the first aspect, in a seventh possible implementation, the power supply module further includes a first disconnect switch apparatus. The first disconnect switch apparatus is connected in series to the first residual current detection circuit, and the first string is connected to the input end of the inverter circuit by using the first disconnect switch apparatus and the first residual current detection circuit. The first controller may control the first disconnect switch apparatus to be turned off, to disconnect the first string from the inverter circuit. An operation is simple and applicability is high.

With reference to the first aspect, in an eighth possible implementation, the power supply module further includes a second disconnect switch apparatus. The second disconnect switch apparatus is connected to the output end of the inverter circuit. The first controller may control the second disconnect switch apparatus to be turned off, to disconnect the inverter circuit from the alternating current power grid. An operation is simple and applicability is high.

With reference to the first aspect, in a ninth possible implementation, the power supply system further includes a third disconnect switch apparatus. The third disconnect switch apparatus is connected to the second residual current detection circuit. The second controller may control the third disconnect switch apparatus to be turned off, to disconnect the second string from each group of power supply modules. An operation is simple and applicability is high.

With reference to the first aspect, in a tenth possible implementation, the power supply system further includes a second direct current-to-direct current conversion circuit. An input end of the second direct current-to-direct current conversion circuit is connected to the second string, and an output end of the second direct current-to-direct current conversion circuit is connected to the third disconnect switch apparatus. When the second residual current value is greater than the second preset residual current threshold, and an output voltage value of the second direct current-to-direct current conversion circuit is not less than a preset output voltage threshold, the second controller controls the third disconnect switch apparatus to be turned off. When the second residual current value is greater than the second preset residual current threshold, and the output voltage value of the second direct current-to-direct current conversion circuit is less than the preset output voltage threshold, the second controller controls the second direct current-to-direct current conversion circuit to stop outputting. In this way, when the second residual current value is greater than the second preset residual current threshold, it may be determined that a power supply or charging loop in which an energy storage battery string is located is a faulty residual current loop, and the faulty residual current loop is cut off, to protect the power supply system. Power can still be supplied to the alternating current power grid when each group of power supply modules is normal, and applicability is high.

With reference to the first aspect, in an eleventh possible implementation, the power supply system further includes a system disconnect switch apparatus. The output ends of the at least two groups of power supply modules are connected to the alternating current power grid by using the system disconnect switch apparatus. The third controller may control the system disconnect switch apparatus to be turned off, to disconnect each group of power supply modules from the alternating current power grid. An operation is simple and applicability is high.

According to a second aspect, this application provides a protection method for a power supply system. The method is applicable to a first controller in any group of power supply modules in the power supply system provided in any one of the first aspect and the possible implementations of the first aspect. The first controller detects a first residual current value of a first string through a first residual current detection circuit; and when the first residual current value is greater than a first preset residual current threshold, controls the first string to be disconnected from an inverter circuit, or controls an inverter circuit to be disconnected from an alternating current power grid, to protect the power supply system.

With reference to the second aspect, in a first possible implementation, the first controller detects a first residual current value at an output end of a first direct current-to-direct current conversion circuit through the first residual current detection circuit.

With reference to the second aspect, in a second possible implementation, the first controller detects a third residual current value at an output end of the inverter circuit through a third residual current detection circuit; and when the third residual current value is greater than a third preset residual current threshold, controls the inverter circuit to be disconnected from the alternating current power grid, or controls the first string to be disconnected from the inverter circuit.

With reference to the second aspect, in a third possible implementation, the first controller detects an insulation impedance value at an input end of the inverter circuit through an insulation impedance detection circuit; and when the insulation impedance value is less than a preset insulation impedance threshold, controls the first string in the power supply module in which the first controller is located to be disconnected from the inverter circuit, or controls the inverter circuit in the power supply module in which the first controller is located to be disconnected from the alternating current power grid.

With reference to the second aspect, in a fourth possible implementation, a first subcontroller controls the first string in the power supply module in which the first subcontroller is located to be disconnected from the inverter circuit, or triggers a second subcontroller to control the inverter circuit in the power supply module in which the second subcontroller is located to be disconnected from the alternating current power grid.

With reference to the second aspect, in a fifth possible implementation, the first controller controls a first disconnect switch apparatus in the power supply module in which the first controller is located to be turned off, to control the first string in the power supply module in which the first controller is located to be disconnected from the inverter circuit.

With reference to the second aspect, in a sixth possible implementation, the first controller controls a second disconnect switch apparatus in the power supply module in which the first controller is located to be turned off, to control the inverter circuit in the power supply module in which the first controller is located to be disconnected from the alternating current power grid.

According to a third aspect, this application provides a protection method for a power supply system. The method is applicable to a second controller in any group of power supply modules in the power supply system provided in any one of the first aspect and the possible implementations of the first aspect. The second controller detects a second residual current value of a first string or a second string through a second residual current detection circuit. When the second residual current detection circuit detects that the second residual current value is greater than a second preset residual current threshold, the second controller controls the second string to be disconnected from each group of power supply modules, or triggers a first controller in each group of power supply modules to control a first string in the power supply module in which the first controller is located to be disconnected from an inverter circuit and the inverter circuit to be disconnected from an alternating current power grid.

With reference to the third aspect, in a first possible implementation, when the second residual current detection circuit detects that the second residual current value is greater than the second preset residual current threshold, the second controller controls a third disconnect switch apparatus to be turned off, to control the second string to be disconnected from each group of power supply modules.

With reference to the third aspect, in a second possible implementation, when the second residual current value is greater than the second preset residual current threshold, and an output voltage value of a second direct current-to-direct current conversion circuit is not less than a preset output voltage threshold, the second controller controls the third disconnect switch apparatus to be turned off.

With reference to the third aspect, in a third possible implementation, when the second residual current value is greater than the second preset residual current threshold, and the output voltage value of the second direct current-to-direct current conversion circuit is less than the preset output voltage threshold, the second controller controls the second direct current-to-direct current conversion circuit to stop outputting.

According to a fourth aspect, this application provides a protection method for a power supply system. The method is applicable to a third controller in the power supply system provided in any one of the first aspect and the possible implementations of the first aspect. The third controller detects a fourth residual current value at output ends of at least two groups of power supply modules through a system residual current detection circuit. When the system residual current detection circuit detects that the fourth residual current value is greater than a fourth preset residual current threshold, the third controller controls each group of power supply modules to be disconnected from an alternating current power grid, or triggers a first controller to control a first string to be disconnected from an inverter circuit.

With reference to the fourth aspect, in a first possible implementation, the third controller controls a system disconnect switch apparatus to be turned off, to control each group of power supply modules to be disconnected from the alternating current power grid.

According to a fifth aspect, this application provides a DC/DC converter. The DC/DC converter includes a direct current-to-direct current conversion circuit, a direct current residual current detection circuit, and a controller. An input end of the direct current-to-direct current conversion circuit is connected to a photovoltaic string, and an output end of the direct current-to-direct current conversion circuit is connected to an alternating current power grid by using an inverter. The direct current residual current detection circuit detects a residual current value of the photovoltaic string, or detects a residual current value of the photovoltaic string and the direct current-to-direct current conversion circuit, and sends the residual current value to the controller. The controller controls the photovoltaic string to be disconnected from the direct current-to-direct current conversion circuit, or triggers the inverter to be disconnected from the alternating current power grid, based on the residual current value.

With reference to the fifth aspect, in a first possible implementation, the DC/DC converter further includes a direct current disconnect switch apparatus. The direct current disconnect switch apparatus is connected to the input end of the direct current-to-direct current conversion circuit. When the residual current value is greater than a preset residual current threshold, the controller controls the direct current disconnect switch apparatus to be turned off, to control the photovoltaic string to be disconnected from the direct current-to-direct current conversion circuit.

With reference to the fifth aspect, in a second possible implementation, the inverter includes an alternating current disconnect switch apparatus. The alternating current disconnect switch apparatus is connected to an output end of the inverter. When the residual current value is greater than a preset residual current threshold, the controller sends an alternating current switch turn-off instruction to the inverter, where the alternating current switch turn-off instruction is used by the inverter to control the alternating current disconnect switch apparatus to be turned off, to trigger the inverter to be disconnected from the alternating current power grid.

With reference to the fifth aspect, in a third possible implementation, when the direct current residual current detection circuit is connected between the photovoltaic string and the input end of the direct current-to-direct current conversion circuit, the direct current residual current detection circuit is configured to detect the residual current value of the photovoltaic string.

With reference to the fifth aspect, in a fourth possible implementation, when the direct current residual current detection circuit is connected to the output end of the direct current-to-direct current conversion circuit, the direct current residual current detection circuit is configured to detect the residual current value of the photovoltaic string and the direct current-to-direct current conversion circuit.

It should be understood that mutual reference may be made to implementation and beneficial effects of the foregoing aspects of this application.

DETAILED DESCRIPTION OF ILLUSTRATIVE EMBODIMENTS

Figure 1A:
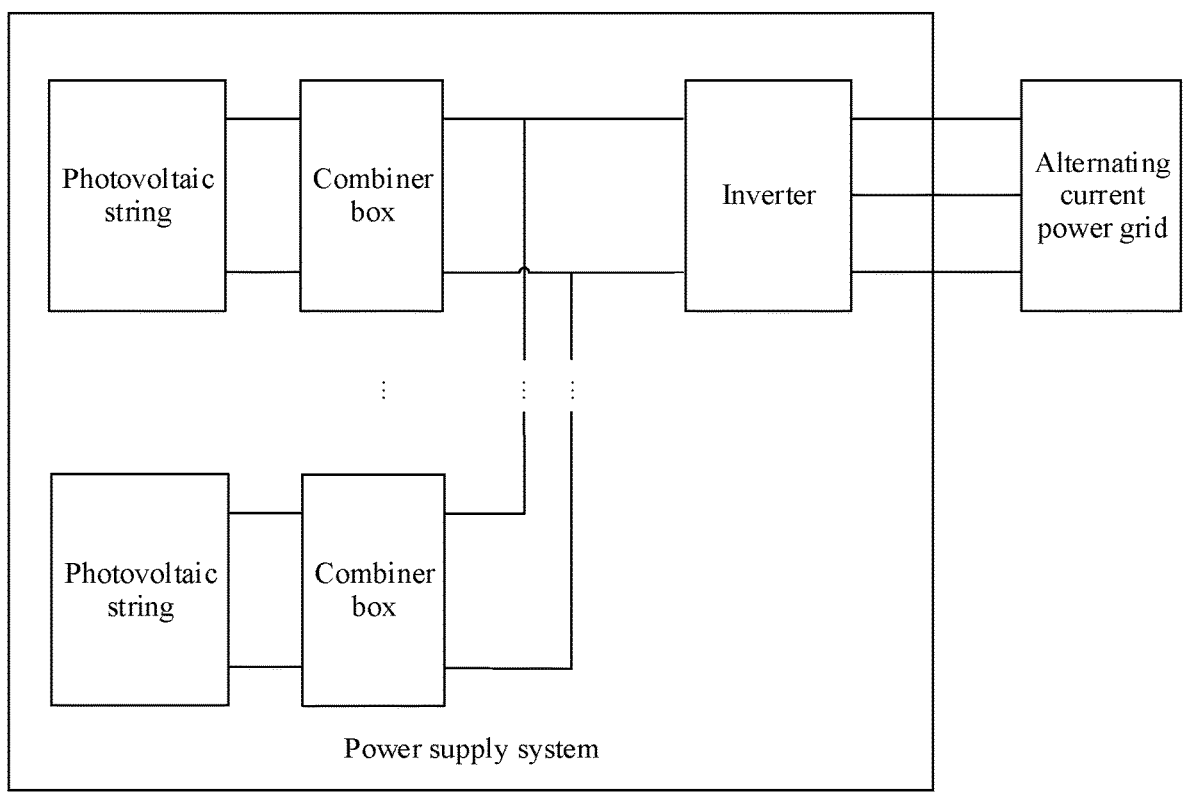
FIG. 1a is a schematic diagram of a structure of a power supply system in the conventional technology.
Figure 1B:
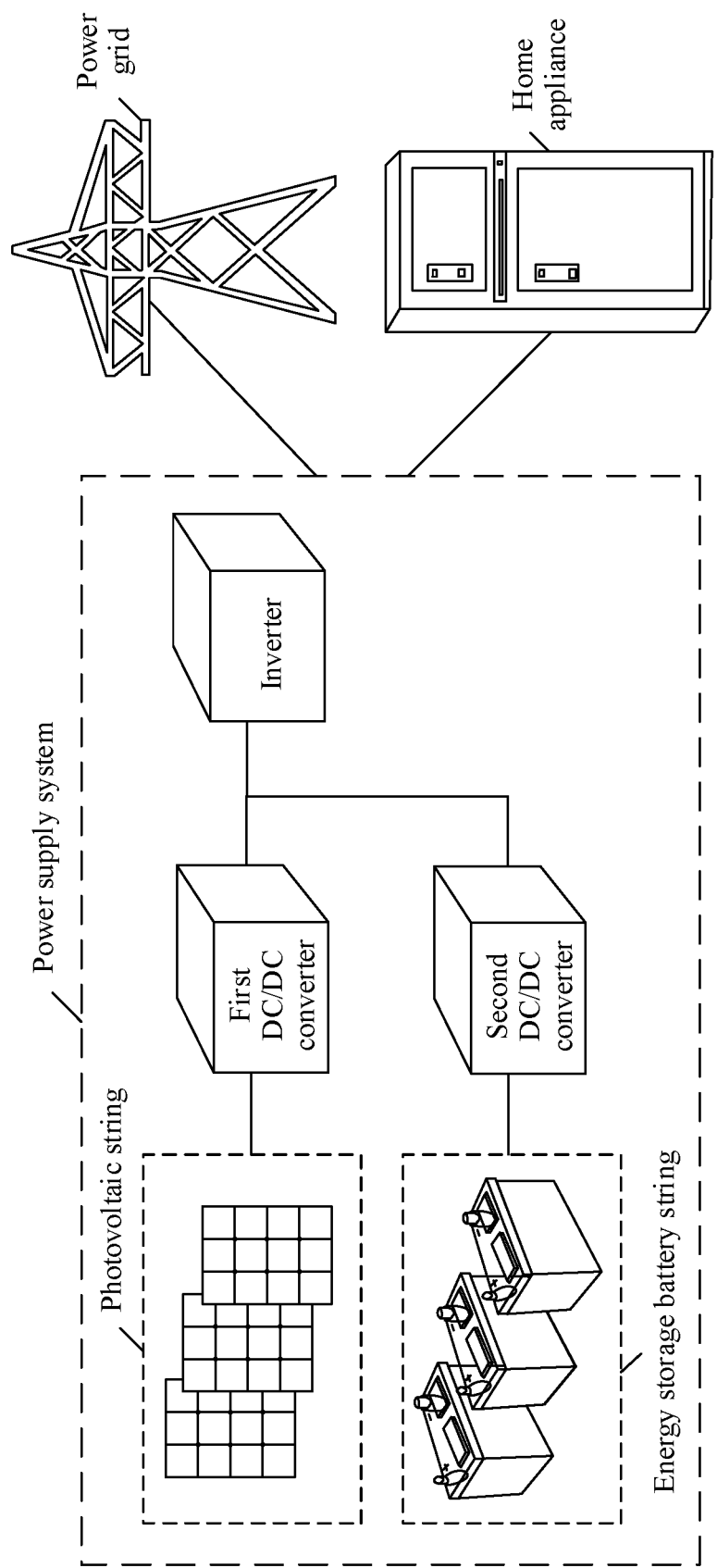
FIG. 1b is a schematic diagram of a structure of a power supply system in a photovoltaic-energy storage hybrid power supply scenario according to this application.

The power supply system and the protection method for a power supply system that are provided in this application may be applied to the following scenarios:

In an optional embodiment, the technical solutions in this application may be applied to a photovoltaic-energy storage hybrid power supply scenario. For example, FIG. 1B is a schematic diagram of a structure of a power supply system in a photovoltaic-energy storage hybrid power supply scenario according to this application. In the photovoltaic-energy storage hybrid power supply scenario, a first string may be a photovoltaic string, a second string may be an energy storage battery string, a first residual current detection circuit may be located in a first DC/DC converter, and an inverter circuit may be located in an inverter. As shown in FIG. 1B, the power supply system may include a power supply module, an energy storage battery string, and a second DC/DC converter. The power supply module includes a photovoltaic string, a first DC/DC converter, and an inverter. The photovoltaic string may include a plurality of photovoltaic modules connected in series or parallel. The photovoltaic module may also be referred to as a solar panel or a photovoltaic panel. The energy storage battery string herein may include at least one battery rack, and battery racks are connected in parallel. One battery rack may include a plurality of battery groups connected in series. The battery group may be a battery pack. One battery pack may include one or more battery units (a voltage of the battery unit is usually between 2.5 V and 4.2 V) connected in series or in parallel, to form a minimum energy storage and management unit. After the power supply system starts to work, a photovoltaic array in the photovoltaic string may convert solar energy into electric energy (namely, direct current energy), and output the electric energy to the first DC/DC converter, and the first DC/DC converter may convert the electric energy input by the photovoltaic array into direct current energy, and output the direct current energy to the inverter, so that the photovoltaic string outputs the direct current energy to the inverter. In the energy storage battery string, each of the at least one battery rack may output direct current energy to the second DC/DC converter, and the second DC/DC converter may convert the direct current energy input by each battery rack into target direct current energy, and output the target direct current energy to the inverter, so that the energy storage battery string outputs the target direct current energy to the inverter. In this case, the inverter may convert the direct current energy input by the photovoltaic string and the target direct current energy input by the energy storage battery string into alternating current energy, and output the alternating current energy to an alternating current power grid or an alternating current load (for example, a home appliance), to supply power to the alternating current power grid or the home appliance.

The power supply module further includes a first controller. The first controller may be located in the first DC/DC converter or the inverter in the power supply module. For example, descriptions are provided below by using an example in which the first controller is located in the first DC/DC converter. After the power supply system starts to run, the first DC/DC converter detects a first residual current value through the first residual current detection circuit, and sends the first residual current value to the first controller. When the received first residual current value is greater than a first preset residual current threshold, the first controller controls the photovoltaic string to be disconnected from the first DC/DC converter, or sends a disconnection instruction to the inverter, so that the inverter is disconnected from the alternating current power grid, to protect the power supply system. The protection manner is flexible and has high applicability.

In another optional embodiment, the technical solutions in this application may be further applied to a photovoltaic power supply scenario. In the photovoltaic power supply scenario, a first string may be a photovoltaic string, a first residual current detection circuit may be located in a DC/DC converter, and an inverter circuit may be located in an inverter. The power supply system may include a power supply module. The power supply module includes a photovoltaic string, a DC/DC converter, and an inverter, which respectively correspond to the photovoltaic string, the first DC/DC converter, and the inverter in FIG. 1B. Herein, for working principles of the photovoltaic string, the DC/DC converter, and the inverter, refer to the descriptions of the corresponding parts in FIG. 1B. Details are not described herein.

The power supply module further includes a first controller. The first controller may be located in the DC/DC converter or the inverter in the power supply module. For example, descriptions are provided below by using an example in which the first controller is located in the inverter. After the power supply system starts to run, the DC/DC converter detects a first residual current value through the first residual current detection circuit, and sends a disconnection instruction to the inverter when the first residual current value is greater than a first preset residual current threshold. The inverter controls, according to the received disconnection instruction, the inverter to be disconnected from an alternating current power grid, to protect the power supply system. The protection manner is flexible and has high applicability.

In still another optional embodiment, the technical solutions in this application may be further applied to a pure storage power supply scenario. In the pure storage power supply scenario, a first string may be an energy storage battery string, a first residual current detection circuit may be located in a DC/DC converter, and an inverter circuit may be located in an inverter. The power supply system may include a power supply module. The power supply module includes an energy storage battery string, a DC/DC converter, and an inverter, which respectively correspond to the energy storage battery string, the second DC/DC converter, and the inverter in FIG. 1B. Herein, for working principles of the energy storage battery string, the DC/DC converter, and the inverter, refer to the descriptions of the corresponding parts in FIG. 1b. Details are not described herein.

The power supply module further includes a first controller. The first controller may be located in the DC/DC converter or the inverter in the power supply module. For example, descriptions are provided below by using an example in which the first controller is located in the DC/DC converter. After the power supply system starts to run, the DC/DC converter detects a first residual current value through the first residual current detection circuit, and when the first residual current value is greater than a first preset residual current threshold, controls the DC/DC converter to be disconnected from the energy storage battery string, or sends a disconnection instruction to the inverter, so that the inverter is disconnected from an alternating current power grid, to protect the power supply system. The protection manner is flexible and has high applicability.

Only examples of an application scenario of the power supply system provided in this application are provided above, and are not exhaustive. The application scenario is not limited in this application. With reference to FIG. 2a to FIG. 8, the power supply system provided in this application is described below by using examples.

Figure 2A:
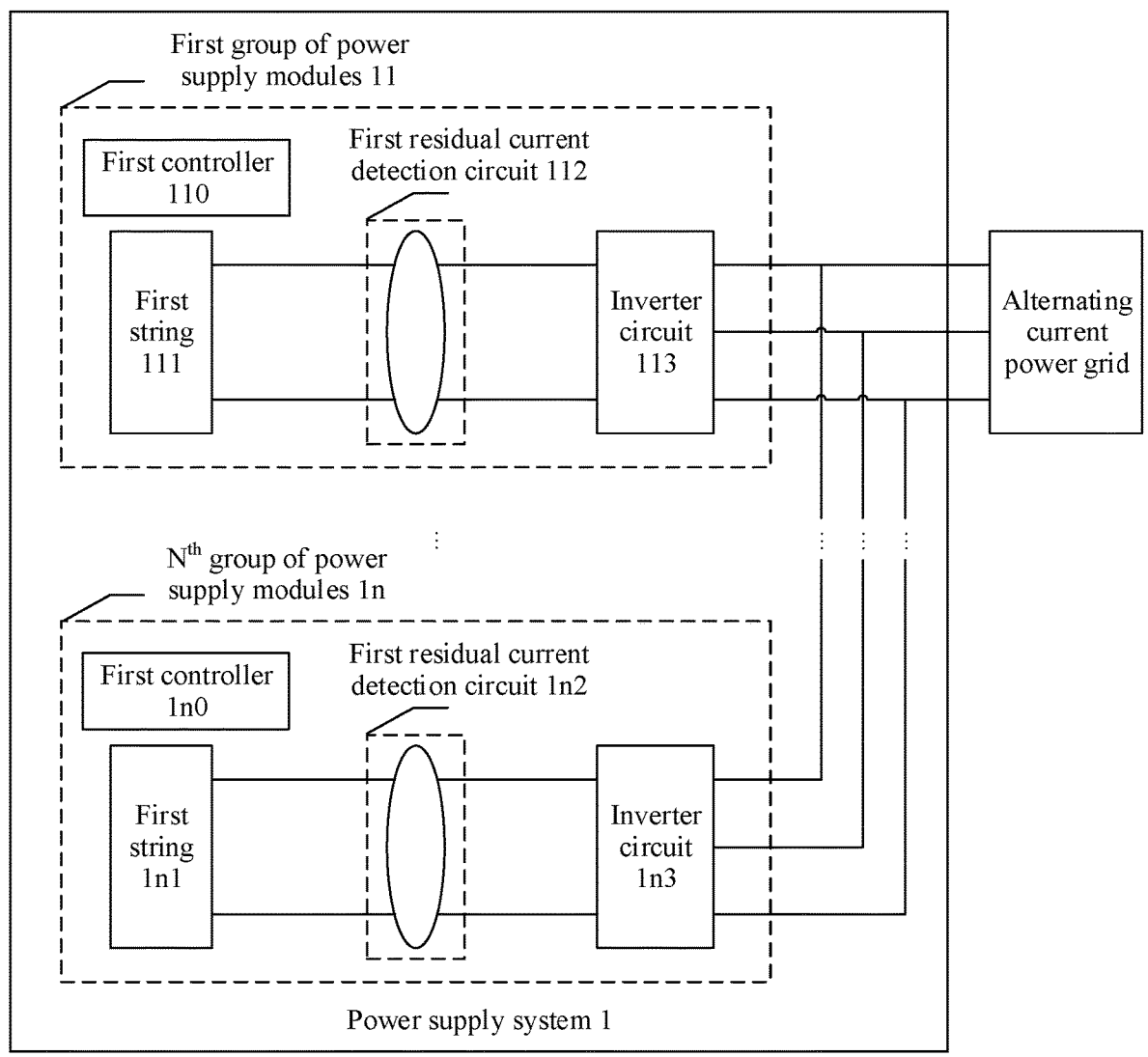
FIG. 2a is a schematic diagram of a structure of a power supply system according to this application.

FIG. 2a is a schematic diagram of a structure of a power supply system according to this application. As shown in FIG. 2a, the power supply system 1 includes a first group of power supply modules 11, . . . , and an $n^{th}$ group of power supply modules in, where n is a positive integer. The first group of power supply modules 11 includes a first controller no, a first string 111, a first residual current detection circuit 112, and an inverter circuit 113, the first residual current detection circuit 112 is connected between the first string in and an input end of the inverter circuit 113, and an output end of the inverter circuit 113 is connected to an alternating current power grid; . . . ; and the $n^{th}$ group of power supply modules in includes a first controller $1n0$, a first string $1n1$, a first residual current detection circuit $1n2$, and an inverter circuit $1n3$, the first residual current detection circuit $1n2$ is connected between the first string $1n1$ and an input end of the inverter circuit $1n3$, and an output end of the inverter circuit $1n3$ is connected to the alternating current power grid.

Working principles of all the groups of power supply modules are the same. Therefore, descriptions are provided below by using the first group of power supply modules 11 as an example.

When the power supply system 1 starts to work, the first residual current detection circuit 112 starts to continuously detect a first residual current value of the first string 111, and sends the detected first residual current value to the first controller 110. Optionally, the first controller 110 sends a current detection instruction to the first residual current detection circuit 112 at a preset frequency. After receiving the current detection instruction, the first residual current detection circuit 112 detects the first residual current value of the first string 111, and returns the first residual current value to the first controller 110.

When the received first residual current value is greater than a first preset residual current threshold, the first controller 110 controls the first string 111 to be disconnected from the inverter circuit 113, or controls the inverter circuit 113 to be disconnected from the alternating current power grid, to protect the power supply system 1. The protection manner is flexible and has high applicability.

Figure 2B:
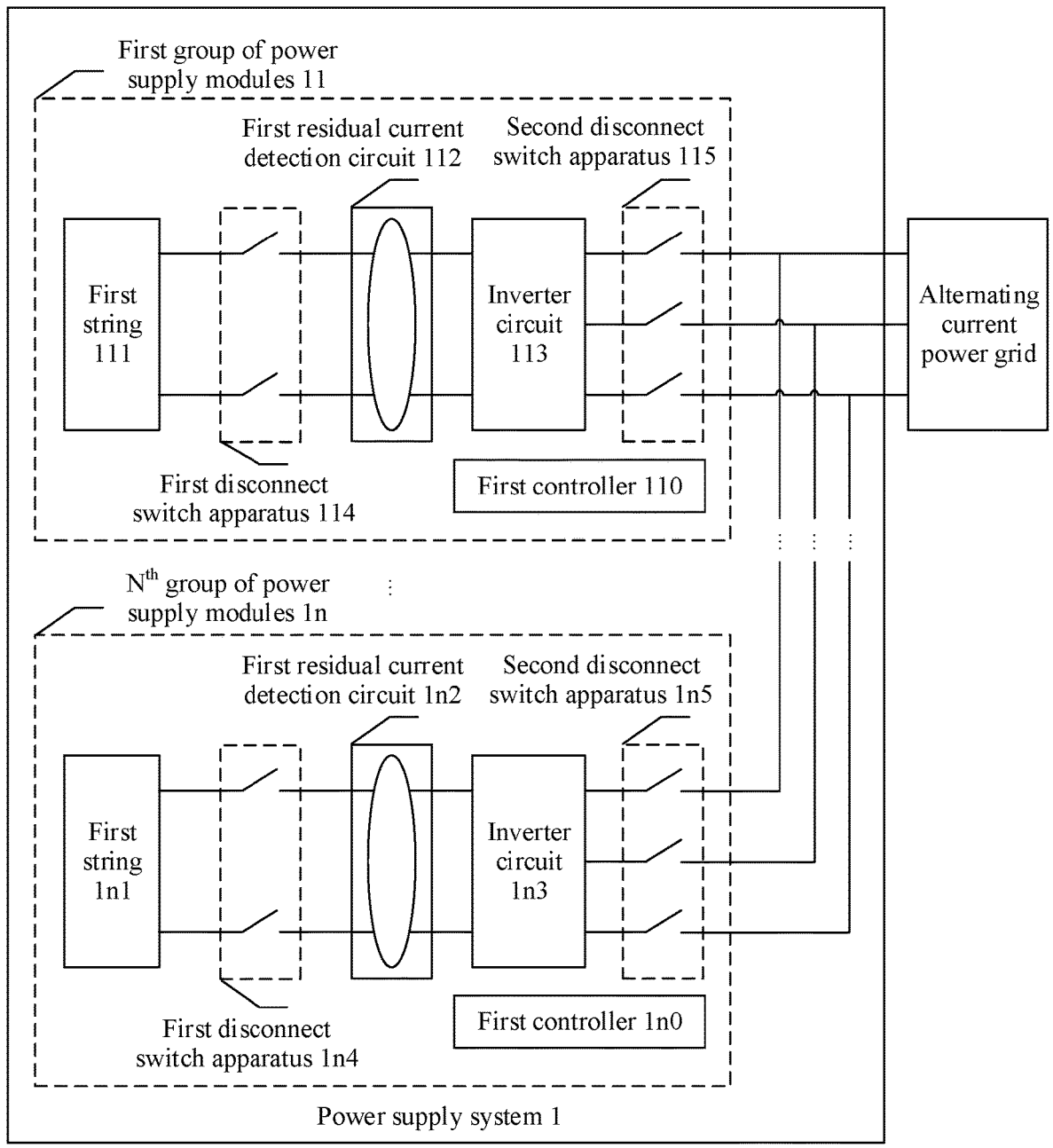
FIG. 2b is another schematic diagram of a structure of a power supply system according to this application.

In an optional embodiment, each group of power supply modules in the power supply system shown in FIG. 2a further includes a first disconnect switch apparatus. For details, refer to another schematic diagram of a structure of the power supply system shown in FIG. 2b. As shown in FIG. 2b, the first group of power supply modules 11 further includes a first disconnect switch apparatus 114, and the first string 111 is connected to the input end of the inverter circuit 113 by using the first disconnect switch apparatus 114; . . . ; and the n$^{th}$ group of power supply modules in further includes a first disconnect switch apparatus 1n4, and the first string 1n1 is connected to the input end of the inverter circuit 1n3 by using the first disconnect switch apparatus 1n4. Optionally, the first disconnect switch apparatus in each group of power supply modules may alternatively be disposed between a first residual current detection circuit and an inverter circuit in each group of power supply modules.

When the first residual current value is greater than the first preset residual current threshold, the first controller 110 determines a power supply module, namely, the first group of power supply modules 11, in which the first controller 110 is located, is a faulty power supply module, and controls the first disconnect switch apparatus 114 to be turned off, so that the first string 111 is disconnected from the inverter circuit 113, to effectively cut off a direct current power supply in the faulty power supply module, so as to effectively protect the power supply system 1, and ensure normal working of a normal power supply module (that is, a first residual current value of the power supply module is less than or equal to the first preset residual current threshold). In this way, it can be ensured that the power supply system 1 can still supply power to the alternating current power grid when some power supply modules in the power supply system 1 are faulty.

In another optional embodiment, each group of power supply modules in the power supply system shown in FIG. 2a further includes a second disconnect switch apparatus. For details, refer to another schematic diagram of a structure of the power supply system shown in FIG. 2b. As shown in FIG. 2b, the first group of power supply modules 11 further includes a second disconnect switch apparatus 115, and the second disconnect switch apparatus 115 is connected to the output end of the inverter circuit 113; . . . ; and the n$^{th}$ group of power supply modules in further includes a second disconnect switch apparatus 1n5, and the second disconnect switch apparatus 1n5 is connected to the output end of the inverter circuit 1n3.

When the first residual current value is greater than the first preset residual current threshold, the first controller 110 determines that the first group of power supply modules 11 is a faulty power supply module, and controls the second disconnect switch apparatus 115 to be turned off, so that the inverter circuit 113 is disconnected from the alternating current power grid, to effectively cut off the faulty power supply module in the power supply system 1, so as to effectively protect the power supply system 1, and ensure normal working of a normal power supply module. In this way, it can be ensured that the power supply system 1 can still supply power to the alternating current power grid when some power supply modules in the power supply system 1 are faulty.

In still another optional embodiment, each group of power supply modules in the power supply system shown in FIG. 2a further includes a first disconnect switch apparatus and a second disconnect switch apparatus. For details, refer to another schematic diagram of a structure of the power supply system shown in FIG. 2b. For a connection relationship between the first disconnect switch apparatus and the second disconnect switch apparatus in each group of power supply modules, refer to the descriptions of the corresponding part in the foregoing two embodiments. Details are not described herein.

When the first residual current value is greater than the first preset residual current threshold, the first controller 110 determines that the first group of power supply modules 11 is a faulty power supply module, and controls the first disconnect switch apparatus 114 and the second disconnect switch apparatus 115 to be turned off, so that the first string 111 is disconnected from the inverter circuit 113, and the inverter circuit 113 is disconnected from the alternating current power grid, to effectively cut off the faulty power supply module in the power supply system 1, so as to effectively protect the power supply system 1, and ensure normal working of a normal power supply module. In this way, it can be ensured that the power supply system 1 can still supply power to the alternating current power grid when some power supply modules in the power supply system 1 are faulty. In addition, both the first disconnect switch apparatus and the second disconnect switch apparatus in the faulty power supply module are turned off. Therefore, it can be ensured that there is no current in each circuit in the faulty module, and safety of a worker during maintenance of the faulty power supply module can be improved.

Figure 3A:
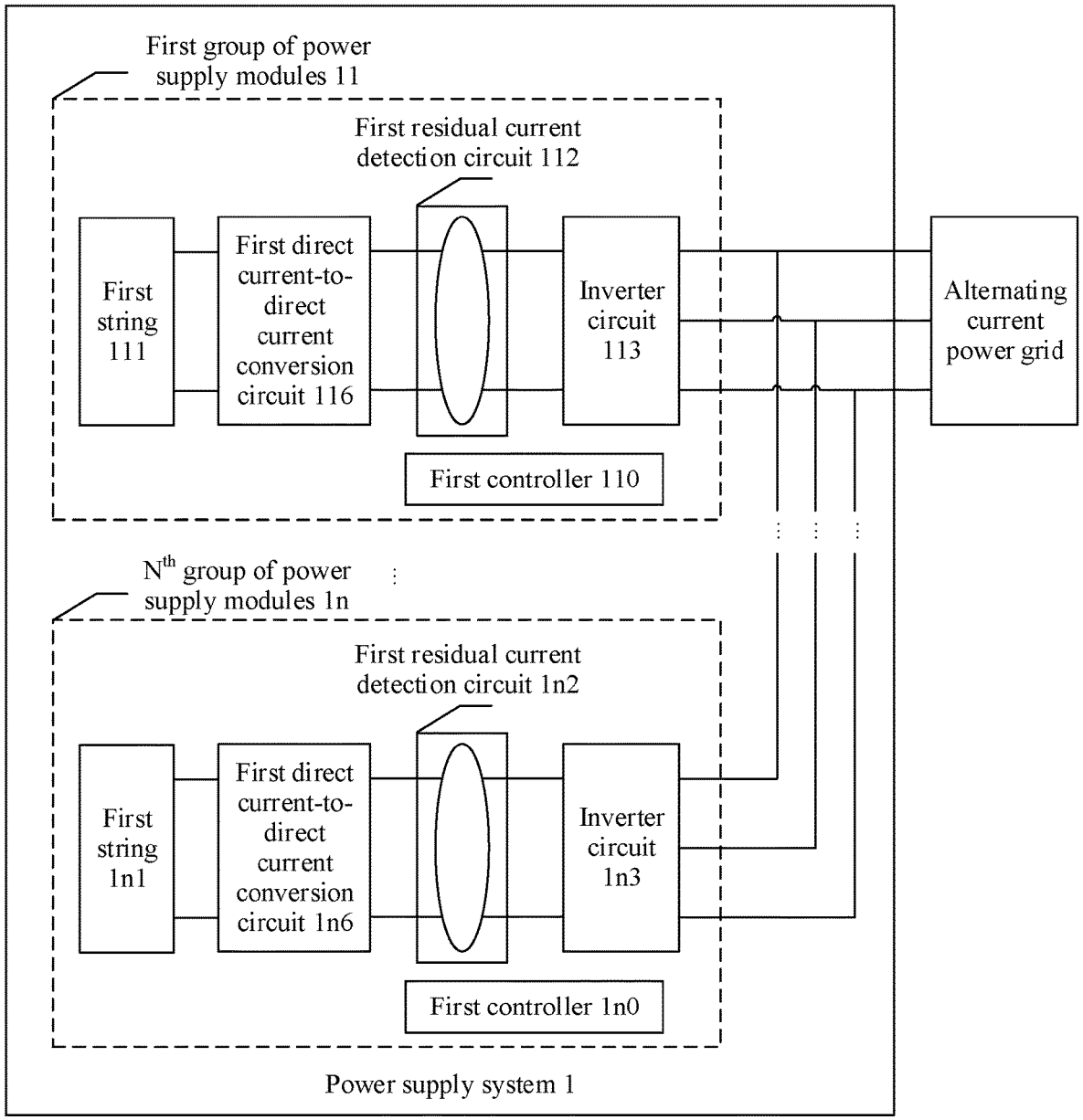
FIG. 3a is another schematic diagram of a structure of a power supply system according to this application.

Further, each group of power supply modules in the power supply system shown in FIG. 2a may further include a first direct current-to-direct current conversion circuit. For details, refer to another schematic diagram of a structure of the power supply system shown in FIG. 3a. As shown in FIG. 3a, the first group of power supply modules 11 further includes a first direct current-to-direct current conversion circuit 116, and the first string 111 is connected to the input end of the inverter circuit 113 by using the first direct current-to-direct current conversion circuit 116; . . . ; and the n$^{th}$ group of power supply modules in further includes a first direct current-to-direct current conversion circuit 1n6, and the first string 1n1 is connected to the input end of the inverter circuit 1n3 by using the first direct current-to-direct current conversion circuit 1n6.

The first residual current detection circuit in each group of power supply modules is configured to detect a first residual current value at an output end of the first direct current-to-direct current conversion circuit in the power supply module in which the first residual current detection circuit is located, namely, a residual current value of a first string and the first direct current-to-direct current conversion circuit.

The working principles of all the groups of power supply modules are the same. Therefore, descriptions are provided below by using the first group of power supply modules 11 as an example.

The first residual current detection circuit 112 detects a first residual current value at an output end of the first direct current-to-direct current conversion circuit 116, namely, a residual current value of the first string 111 and the first direct current-to-direct current conversion circuit 116, and sends the first residual current value to the first controller 110. When the received first residual current value is greater than a first preset residual current threshold, the first controller 110 controls the first string 111 to be disconnected from the inverter circuit 113, or controls the inverter circuit 113 to be disconnected from the alternating current power grid, to protect the power supply system 1. The protection manner is flexible and has high applicability.

Figure 3B:
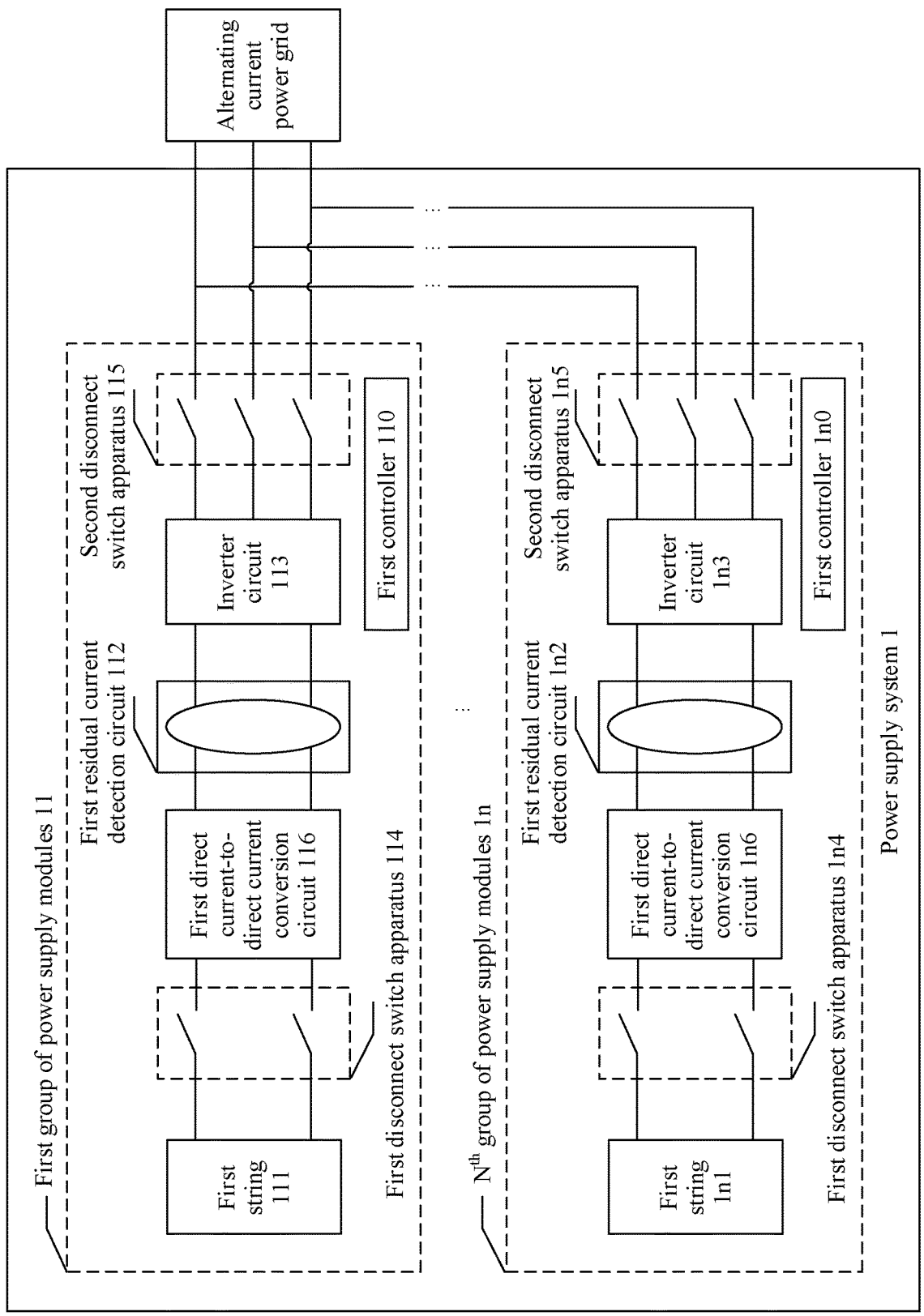
FIG. 3b is another schematic diagram of a structure of a power supply system according to this application.

In an optional embodiment, each group of power supply modules in the power supply system shown in FIG. 3a further includes a first disconnect switch apparatus. For details, refer to another schematic diagram of a structure of the power supply system shown in FIG. 3b. As shown in FIG. 3b, the first group of power supply modules 11 further includes a first disconnect switch apparatus 114, and the first string 111 is connected to the input end of the inverter circuit 113 by using the first disconnect switch apparatus 114 and the first direct current-to-direct current conversion circuit 116; . . . ; and the n$^{th}$ group of power supply modules in further includes a first disconnect switch apparatus 1n4, and the first string 1n1 is connected to the input end of the inverter circuit 1n3 by using the first disconnect switch apparatus 1n4 and the first direct current-to-direct current conversion circuit 1n6.

Optionally, the first disconnect switch apparatus in each group of power supply modules may alternatively be disposed between the first direct current-to-direct current conversion circuit and the inverter circuit in each group of power supply modules, and the first residual current detection circuit in each group of power supply modules may alternatively be disposed between the first string and the first direct current-to-direct current conversion circuit.

When the first residual current value is greater than the first preset residual current threshold, the first controller 110 determines that the first group of power supply modules 11 is a faulty power supply module, and controls the first disconnect switch apparatus 114 to be turned off, to control the first string 111 to be disconnected from the first direct current-to-direct current conversion circuit 116, that is, control the first string 111 to be disconnected from the inverter circuit 113, to effectively cut off a direct current power supply in the faulty power supply module, so as to effectively protect the power supply system 1, and ensure normal working of a normal power supply module. In this way, it can be ensured that the power supply system 1 can still supply power to the alternating current power grid when some power supply modules in the power supply system 1 are faulty.

In another optional embodiment, each group of power supply modules in the power supply system shown in FIG. 3a further includes a second disconnect switch apparatus. For details, refer to another schematic diagram of a structure of the power supply system shown in FIG. 3b. As shown in FIG. 3b, the first group of power supply modules 11 further includes a second disconnect switch apparatus 1n5, and the second disconnect switch apparatus 115 is connected to the output end of the inverter circuit 113; . . . ; and the n$^{th}$ group of power supply modules in further includes a second disconnect switch apparatus 1n5, and the second disconnect switch apparatus 1n5 is connected to the output end of the inverter circuit 1n3.

When the first residual current value is greater than the first preset residual current threshold, the first controller 110 determines that the first group of power supply modules 11 is a faulty power supply module, and controls the second disconnect switch apparatus 115 to be turned off, so that the inverter circuit 113 is disconnected from the alternating current power grid, to effectively cut off the faulty power supply module in the power supply system 1, so as to effectively protect the power supply system 1, and ensure normal working of a non-faulty power supply module. In this way, it can be ensured that the power supply system 1 can still supply power to the alternating current power grid when some power supply modules in the power supply system 1 are faulty.

In still another optional embodiment, each group of power supply modules in the power supply system shown in FIG. 3a further includes a first disconnect switch apparatus and a second disconnect switch apparatus. For details, refer to another schematic diagram of a structure of the power supply system shown in FIG. 3b. For a connection relationship between the first disconnect switch apparatus and the second disconnect switch apparatus in each group of power supply modules, refer to the descriptions of the corresponding part in the foregoing two embodiments. Details are not described herein.

When the first residual current value is greater than the first preset residual current threshold, the first controller 110 determines that the first group of power supply modules 11 is a faulty power supply module, and controls the first disconnect switch apparatus 114 and the second disconnect switch apparatus 115 to be turned off, so that the first string 111 is disconnected from the first direct current-to-direct current conversion circuit 116, and the inverter circuit 113 is disconnected from the alternating current power grid, to effectively cut off the faulty power supply module in the power supply system 1, so as to effectively protect the power supply system 1, and ensure normal working of a normal power supply module. In this way, it can be ensured that the power supply system 1 can still supply power to the alternating current power grid when some power supply modules in the power supply system 1 are faulty. In addition, both the first disconnect switch apparatus and the second disconnect switch apparatus in the faulty power supply module are turned off. Therefore, it can be ensured that there is no current in each circuit in the faulty power supply module, and safety of a worker during maintenance of the faulty power supply module can be improved.

Figure 4A:
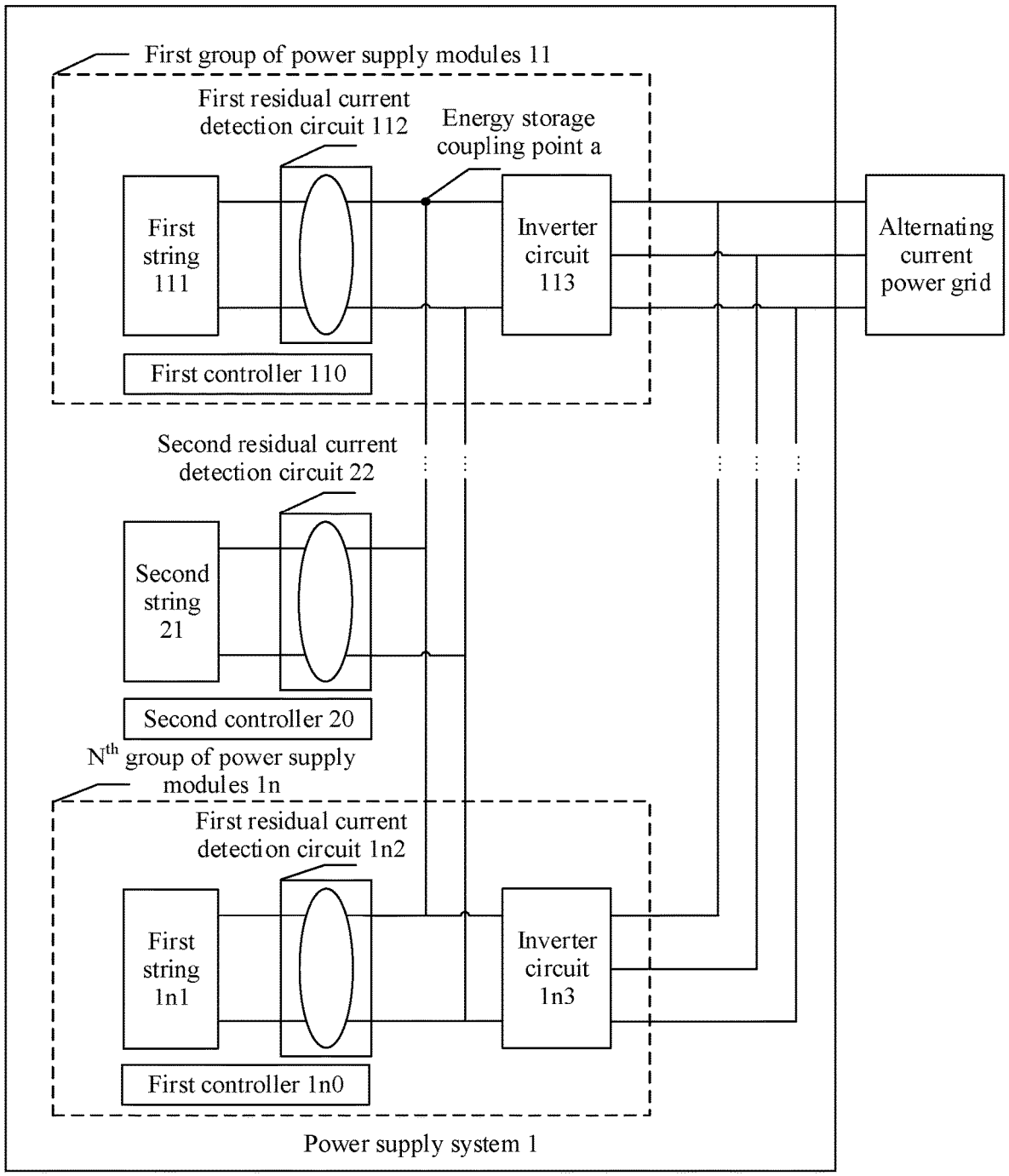
FIG. 4a is another schematic diagram of a structure of a power supply system according to this application.

Further, the power supply systems shown in FIG. 2a and FIG. 3a further include a second string, a second residual current detection circuit, and a second controller. When the power supply system shown in FIG. 2a or FIG. 3a further includes the second string, the second residual current detection circuit, and the second controller, steps of protecting the power supply system are consistent. Therefore, descriptions are provided below by using an example in which the power supply system shown in FIG. 2a further includes the second string, the second residual current detection circuit, and the second controller. For details, refer to another schematic diagram of a structure of the power supply system shown in FIG. 4a. As shown in FIG. 4a, the power supply system 1 further includes a second controller 20, a second string 21, and a second residual current detection circuit 22. The second residual current detection circuit 22 is connected between the second string 21 and the input end of the inverter circuit 113, . . . , and the input end of the inverter circuit 1n3. That is, the second residual current detection circuit 22 is connected between a point at which input ends of inverter circuits in all the groups of power supply modules are connected in parallel and the second string 21. Optionally, the first residual current detection circuit in each group of power supply modules may alternatively be disposed between an energy storage coupling point and the inverter circuit in each group of power supply modules. For example, an energy storage coupling point in the first group of power supply modules 11 is a.

The second string 21 may be an energy storage battery string. The second residual current detection circuit 22 is configured to detect a second residual current value of the second string 21 or the first string in each group of power supply modules. Specifically, when the second string 21 is in a discharging state, the second residual current detection circuit 22 detects the second residual current value of the second string 21; or when the second string 21 is in a charging state, the second residual current detection circuit 22 detects a second residual current value of each first string connected to an output end of the second residual current detection circuit 22.

When the power supply system 1 starts to run, the second residual current detection circuit 22 starts to continuously detect the second residual current value of the second string 21 or the first string in each group of power supply modules, and sends the detected second residual current value to the second controller 20. Optionally, the second controller 20 sends a current detection instruction to the second residual current detection circuit 22 at a preset frequency. After receiving the current detection instruction, the second residual current detection circuit 22 detects the second residual current value of the second string 21 or the first string in each group of power supply modules, and returns the second residual current value to the second controller 20.

When the received second residual current value is greater than a second preset residual current threshold, the second controller 20 controls the second string 21 to be disconnected from each group of power supply modules, or triggers a first controller in each group of power supply modules to control the first string to be disconnected from the inverter circuit and the inverter circuit to be disconnected from the alternating current power grid, to protect the power supply system 1. The protection manner is flexible and has high applicability.

Figure 4B:
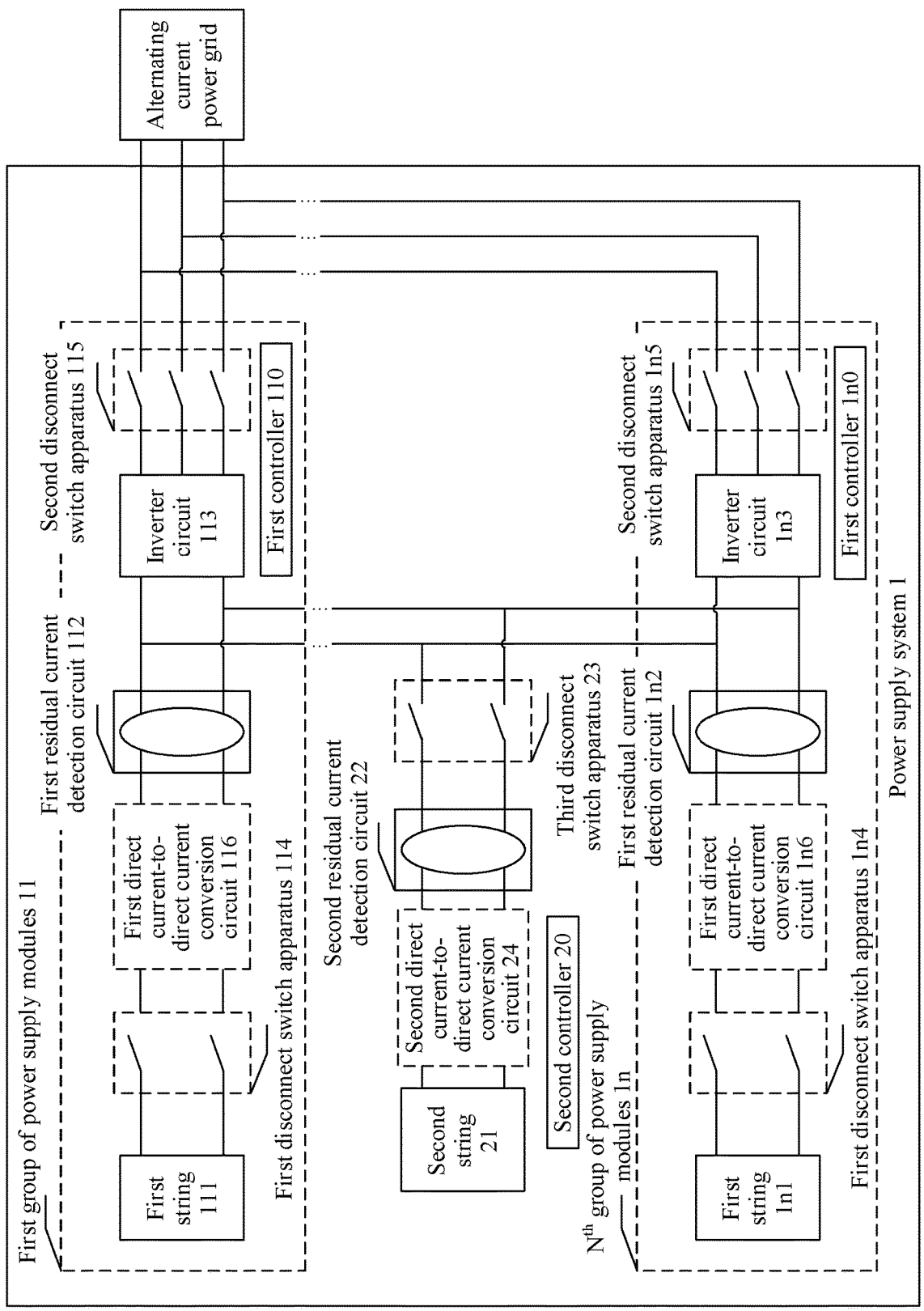
FIG. 4b is another schematic diagram of a structure of a power supply system according to this application.

In an optional embodiment, the power supply system shown in FIG. 4a further includes a third disconnect switch apparatus 23. For details, refer to another schematic diagram of a structure of the power supply system shown in FIG. 4b. As shown in FIG. 4b, the second string 21 is connected to the input end of the inverter circuit 113, . . . , and the input end of the inverter circuit 1n3 by using the third disconnect switch apparatus 23.

When the second residual current value is greater than the second preset residual current threshold, the second controller 20 determines that a power supply loop or a charging loop in which the second string 21 and the second residual current detection circuit 22 are located is a faulty residual current loop, and controls the third disconnect switch apparatus 23 to be turned off, so that the second string 21 is disconnected from each group of power supply modules, to effectively cut off the faulty residual current loop in the power supply system 1, so as to protect the power supply system 1, and ensure that each group of power supply modules can still supply power to the alternating current power grid.

Further, the power supply system shown in FIG. 4b further includes a second direct current-to-direct current conversion circuit 24. An input end of the second direct current-to-direct current conversion circuit 24 is connected to the second string 21, and an output end of the second direct current-to-direct current conversion circuit 24 is connected to the third disconnect switch apparatus 23.

Specifically, when the second residual current value is greater than the second preset residual current threshold, and an output voltage value of the second direct current-to-direct current conversion circuit 24 is not less than a preset output voltage threshold, the second controller 20 controls the third disconnect switch apparatus 23 to be turned off. For example, the preset output voltage threshold may be 0. When the second residual current value is greater than the second preset residual current threshold, and the output voltage value of the second direct current-to-direct current conversion circuit 24 is less than the preset output voltage threshold, the second controller 20 controls the second direct current-to-direct current conversion circuit 24 to stop outputting, that is, controls a duty cycle of a pulse width modulation wave input to the second direct current-to-direct current conversion circuit 24 to be 0, so that outputting by the second direct current-to-direct current conversion circuit 24 can be disabled, to cut off the faulty residual current loop from a circuit, so as to protect the power supply system 1, and ensure that each group of power supply modules can still supply power to the alternating current power grid.

In another optional embodiment, each group of power supply modules in the power supply system shown in FIG. 4a further includes a first disconnect switch apparatus and a second disconnect switch apparatus. For details, refer to another schematic diagram of a structure of the power supply system shown in FIG. 4b. As shown in FIG. 4b, the first group of power supply modules 11 further includes a first disconnect switch apparatus 114, a second disconnect switch apparatus 115, and a first direct current-to-direct current conversion circuit 116, one end of the first disconnect switch apparatus 114 is connected to the first string 11, the other end of the first disconnect switch apparatus 114 is connected to the input end of the inverter circuit 113 by using the first direct current-to-direct current conversion circuit 116, the output end of the inverter circuit 113 is connected to one end of the second disconnect switch apparatus 115, and the other end of the second disconnect switch apparatus 115 is connected to the alternating current power grid; . . . ; and the $n^{th}$ group of power supply modules in further includes a first disconnect switch apparatus 1n4, a second disconnect switch apparatus 1n5, and a first direct current-to-direct current conversion circuit 1n6, one end of the first disconnect switch apparatus 1n4 is connected to the first string 1n1, the other end of the first disconnect switch apparatus 1n4 is connected to the input end of the inverter circuit 1n3 by using the first direct current-to-direct current conversion circuit 1n6, the output end of the inverter circuit 1n3 is connected to one end of the second disconnect switch apparatus 1n5, and the other end of the second disconnect switch apparatus 1n5 is connected to the alternating current power grid.

When the second residual current value is greater than the second preset residual current threshold, the second controller 20 determines that a power supply loop or a charging loop in which the second string 21 and the second residual current detection circuit 22 are located is a faulty residual current loop, and sends an alternating/direct current switch turn-off instruction to the first controller in each group of power supply modules. The first controller in each group of power supply modules controls, according to the received alternating/direct current switch turn-off instruction, the first disconnect switch apparatus and the second disconnect switch apparatus in the power supply module in which the first controller is located to be turned off, so that the first string in each group of power supply modules is disconnected from the first direct current-to-direct current conversion circuit and the inverter circuit is disconnected from the alternating current power grid, to effectively cut off the faulty residual current loop, and ensure that there is no residual current in the second residual current detection circuit 22, so as to protect the power supply system 1.

Figure 5:
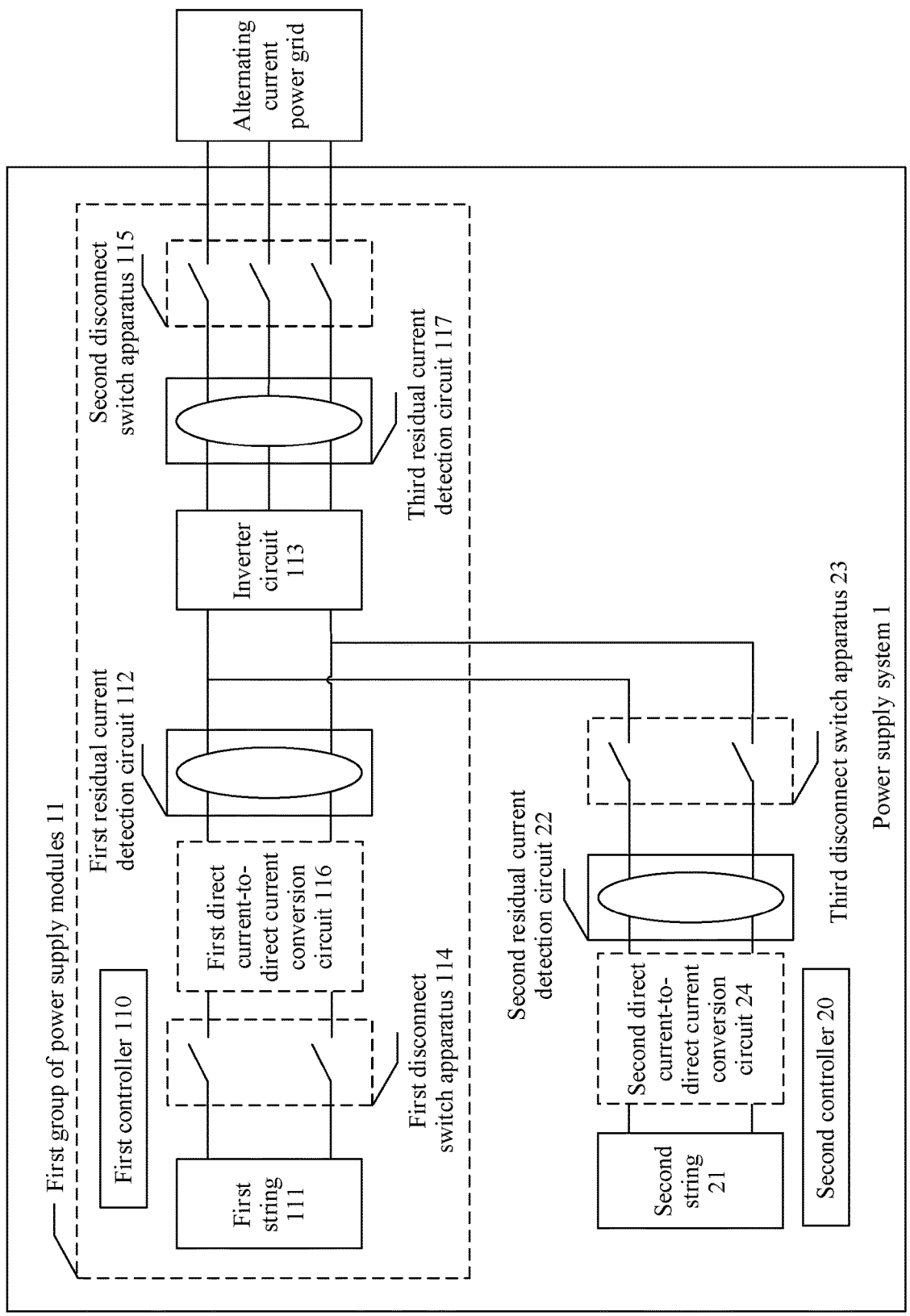
FIG. 5 is another schematic diagram of a structure of a power supply system according to this application.

Further, when the power supply system shown in FIG. 4b includes one group of power supply modules, the power supply module further includes a third residual current detection circuit. For details, refer to another schematic diagram of a structure of the power supply system shown in FIG. 5. As shown in FIG. 5, the power supply system 1 includes the first group of power supply modules 11, and the first group of power supply modules 11 further includes a third residual current detection circuit 117, configured to detect a third residual current value at the output end of the inverter circuit 113, namely, a residual current value of the power supply system 1.

When the power supply system 1 starts to run, the third residual current detection circuit 117 starts to continuously detect the third residual current value at the output end of the inverter circuit 113, and sends the third residual current value to the first controller 110. Optionally, the first controller 110 sends a current detection instruction to the third residual current detection circuit 117 at a preset frequency. After receiving the current detection instruction, the third residual current detection circuit 117 detects the third residual current value at the output end of the inverter circuit 113, and returns the third residual current value to the first controller 110.

When the received third residual current value is greater than a third preset residual current threshold, the first controller 110 determines that a power supply loop in which the inverter circuit 113 and the third residual current detection circuit 117 are located is a faulty residual current loop, and controls the second string 21 to be disconnected from the first group of power supply modules 11, and controls the first string 111 to be disconnected from the inverter circuit 113, or controls the inverter circuit 113 to be disconnected from the alternating current power grid. In this way, when the third residual current value is greater than the third preset residual current threshold, the faulty residual current loop may be effectively cut off, to protect the power supply system 1.

In an optional embodiment, when the third residual current value is greater than the third preset residual current threshold, the first controller 110 controls the second disconnect switch apparatus 15 to be turned off, so that the inverter circuit 113 is disconnected from the alternating current power grid, to directly cut off the faulty residual current loop on an alternating side, so as to protect the power supply system 1. An operation is simple and applicability is high.

In another optional embodiment, when the third residual current value is greater than the third preset residual current threshold, the first controller 110 controls the first disconnect switch apparatus 114 to be turned off, so that the first string 111 is disconnected from the first direct current-to-direct current conversion circuit 116, and sends an energy storage switch turn-off instruction to the second controller 20. The second controller 20 controls, according to the received energy storage switch turn-off instruction, the third disconnect switch apparatus 23 to be turned off, so that the second string 21 is disconnected from the inverter circuit 113, to effectively cut off a direct current power supply in the power supply system 1, and ensure that there is no current in each circuit in the first group of power supply modules 11, so as to protect the power supply system 1, and improve safety of a worker during maintenance of the first group of power supply modules 11.

It should be noted that in addition to the manner of controlling the third disconnect switch apparatus 23 to be turned off, the second controller 20 may ensure, in the following manner, that the second string 21 is disconnected from the inverter circuit 113: When the power supply system 1 includes the second direct current-to-direct current conversion circuit 24, if the output voltage value of the second direct current-to-direct current conversion circuit 24 is less than the preset output voltage threshold, the second controller 20 may further control, according to the energy storage switch turn-off instruction, the second direct current-to-direct current conversion circuit 24 to stop outputting, to ensure that no electric energy is transferred between the second direct current-to-direct current conversion circuit 24 and the inverter circuit 113. Flexibility is high.

Figure 6:
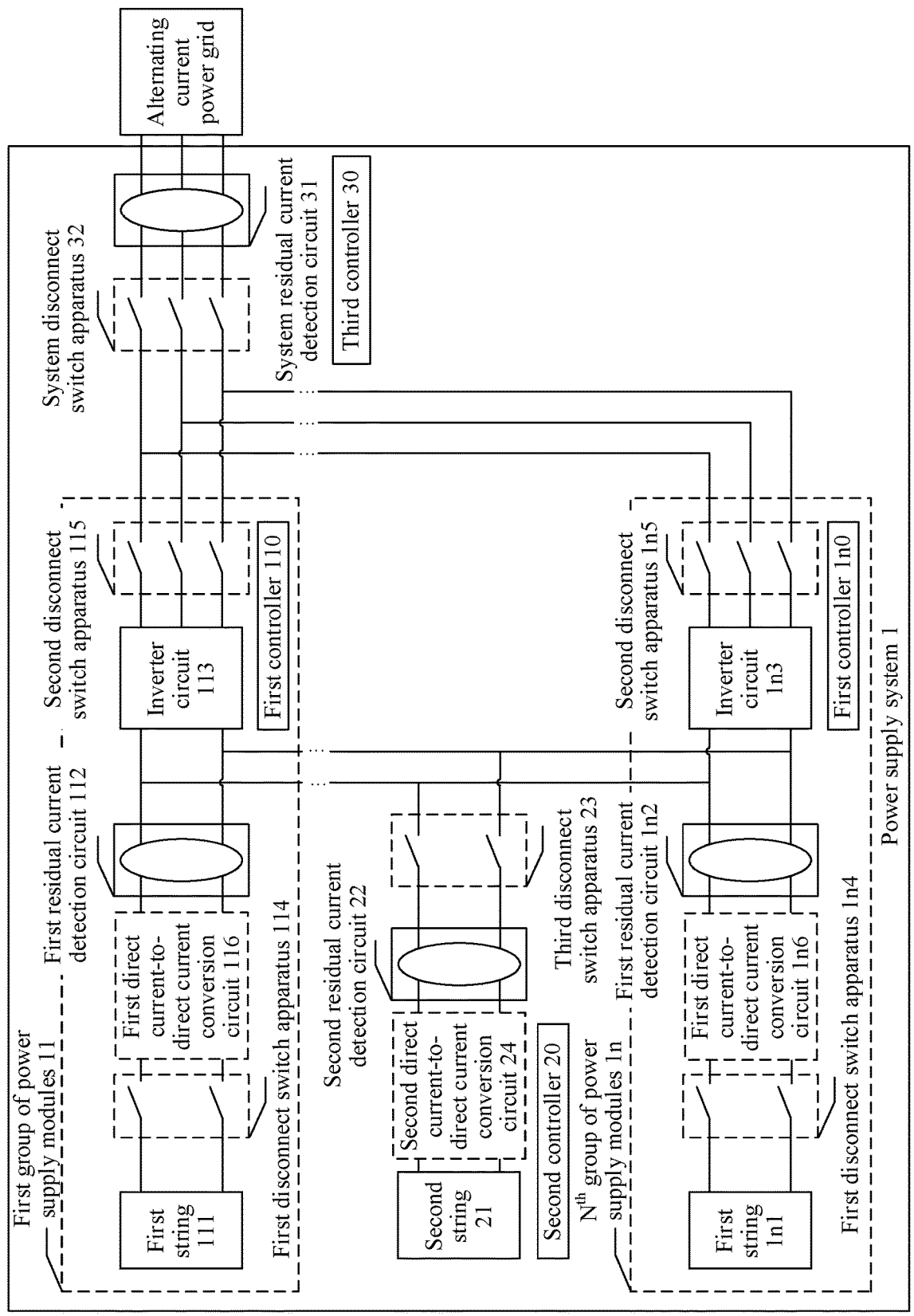
FIG. 6 is another schematic diagram of a structure of a power supply system according to this application.

Further, when the power supply system shown in FIG. 4b includes at least two groups of power supply modules, the power supply system 1 further includes a system residual current detection circuit. For details, refer to another schematic diagram of a structure of the power supply system shown in FIG. 6. As shown in FIG. 6, the power supply system 1 further includes a third controller 30 and a system residual current detection circuit 31. The system residual current detection circuit 31 is connected between a point at which an output end of the first group of power supply modules 11, . . . , and an output end of the $n^{th}$ group of power supply modules in are connected in parallel and the alternating current power grid, and is configured to detect a fourth residual current value at the output end of the first group of power supply modules 11, . . . , and the output end of the $n^{th}$ group of power supply modules in, namely, a residual current value of the power supply system 1, where n is an integer greater than or equal to 2.

When the power supply system 1 starts to run, the system residual current detection circuit 31 starts to continuously detect the fourth residual current value at the output end of the first group of power supply modules 11, . . . , and the output end of the $n^{th}$ group of power supply modules in, and sends the detected fourth residual current value to the third controller 30. Optionally, the third controller 30 sends a current detection instruction to the system residual current detection circuit 31 at a preset frequency. The system residual current detection circuit 31 detects, according to the received current detection instruction, the fourth residual current value at the output end of the first group of power supply modules 11, . . . , and the output end of the $n^{th}$ group of power supply modules in, and returns the fourth residual current value to the third controller 30.

When the received fourth residual current value is greater than a fourth preset residual current threshold, the third controller 30 controls each group of power supply modules to be disconnected from the alternating current power grid, or triggers the first controller in each group of power supply modules to control the first string in the power supply module in which the first controller is located to be disconnected from the inverter circuit, to effectively avoid a case in which in an existing solution, due to a cross current generated between at least two inverter circuits, there is detection difficulty for a residual current detection circuit located at an output end of the inverter circuit, and consequently a power supply system cannot be effectively protected.

In an optional embodiment, the power supply system 1 further includes a system disconnect switch apparatus 32. The output end of the first group of power supply modules 11, . . . , and the output end of the $n^{th}$ group of power supply modules in are connected in parallel, and then are connected to the alternating current power grid by using the system disconnect switch apparatus 32. It should be noted that the third controller 30, the system residual current detection circuit 31, and the system disconnect switch apparatus 32 may be located in a same device.

When the fourth residual current value is greater than the fourth preset residual current threshold, the third controller 30 controls the system disconnect switch apparatus 32 to be turned off, so that each group of power supply modules is disconnected from the alternating current power grid, to ensure that there is no residual current in the system residual current detection circuit 31, so as to protect the power supply system 1.

In another optional embodiment, when each group of power supply modules includes the second disconnect switch apparatus, if the fourth residual current value is greater than the fourth preset residual current threshold, the third controller 30 sends an alternating current switch turn-off instruction to the first controller in each group of power supply modules. The first controller in each group of power supply modules controls, according to the received alternating current switch turn-off instruction, the second disconnect switch apparatus in the power supply module in which the first controller is located to be turned off, so that each group of power supply modules is disconnected from the alternating current power grid, to ensure that there is no residual current in the system residual current detection circuit 31, so as to protect the power supply system 1.

In another optional embodiment, when each group of power supply modules includes the first disconnect switch apparatus, and the power supply system 1 does not include the second string 21, if the fourth residual current value is greater than the fourth preset residual current threshold, the third controller 30 sends a direct current switch turn-off instruction to the first controller in each group of power supply modules. The first controller in each group of power supply modules controls, according to the received direct current switch turn-off instruction, the first disconnect switch apparatus in the power supply module in which the first controller is located to be turned off, so that the first string in each group of power supply modules is disconnected from the first direct current-to-direct current conversion circuit, to ensure that there is no current in each circuit in the power supply system 1, so as to protect the power supply system 1, and improve safety of a worker during maintenance of the power supply system 1.

In another optional embodiment, when the power supply system 1 includes the second string 21 and the system disconnect switch apparatus 32, and each group of power supply modules includes the first disconnect switch apparatus 114 and the second disconnect switch apparatus 115, if the fourth residual current value is greater than the fourth preset residual current threshold, the third controller 30 controls the system disconnect switch apparatus 32 to be turned off, so that the power supply system 1 is disconnected from the alternating current power grid, and sends an alternating/direct current switch turn-off instruction to the first controller in each group of power supply modules. The first controller in each group of power supply modules controls, according to the received alternating/direct current switch turn-off instruction, both the first disconnect switch apparatus and the second disconnect switch apparatus in the power supply module in which the first controller is located to be turned off, so that there is no current in each circuit in each group of power supply modules, to protect the power supply system 1, and improve safety of a worker during maintenance of the power supply system 1.

In still another optional embodiment, when the power supply system 1 includes the second string 21 and the third disconnect switch apparatus 23, and each power supply module includes the first disconnect switch apparatus, if the fourth residual current value is greater than the fourth preset residual current threshold, the third controller 30 sends a direct current switch turn-off instruction to the first controller in each group of power supply modules, and sends an energy storage switch turn-off instruction to the second controller 20. The first controller in each group of power supply modules controls, according to the received direct current switch turn-off instruction, the first disconnect switch apparatus in the power supply module in which the first controller is located to be turned off, so that the first string in each group of power supply modules is disconnected from the first direct current-to-direct current conversion circuit. The second controller 20 controls, according to the received energy storage switch turn-off instruction, the third disconnect switch apparatus 23 to be turned off. In this way, it can be ensured that there is no residual current in the system residual current detection circuit 31, and it is ensured that there is no current in each circuit in the power supply system 1, to protect the power supply system 1, and improve safety of a worker during maintenance of the power supply system 1 to protect the power supply system 1.

Further, when the power supply system 1 includes the second direct current-to-direct current conversion circuit 24, if the output voltage value of the second direct current-to-direct current conversion circuit 24 is less than the preset output voltage threshold, the second controller 20 controls, according to the received energy storage switch turn-off instruction, the second direct current-to-direct current conversion circuit 24 to stop outputting; or if the output voltage value of the second direct current-to-direct current conversion circuit 24 is not less than the preset output voltage threshold, the second controller 20 controls the third disconnect switch apparatus 23 to be turned off, so that the second string 21 is disconnected from each group of power supply modules.

In addition, in the power supply system 1 shown in FIG. 6, when the first residual current value detected by the first residual current detection circuit in each group of power supply modules is not greater than the first preset residual current threshold, the second residual current value detected by the second residual current detection circuit 22 is not greater than the second preset residual current threshold, and the fourth residual current value detected by the system residual current detection circuit 31 is greater than the fourth preset residual current threshold, it may be determined that leakage occurs on a direct current parallel line and at a back end position of the direct current parallel line, and an accurate alarm is made. Applicability is high.

It should be noted that when the power supply system 1 shown in FIG. 2a to FIG. 6 is an IT system (namely, a grounding system), each group of power supply modules may further include an insulation impedance detection circuit. The insulation impedance detection circuit may be disposed between the input end of the inverter circuit and the energy storage coupling point, or may be disposed between the first string and the energy storage coupling point. This is not limited in this application.

Figure 7:
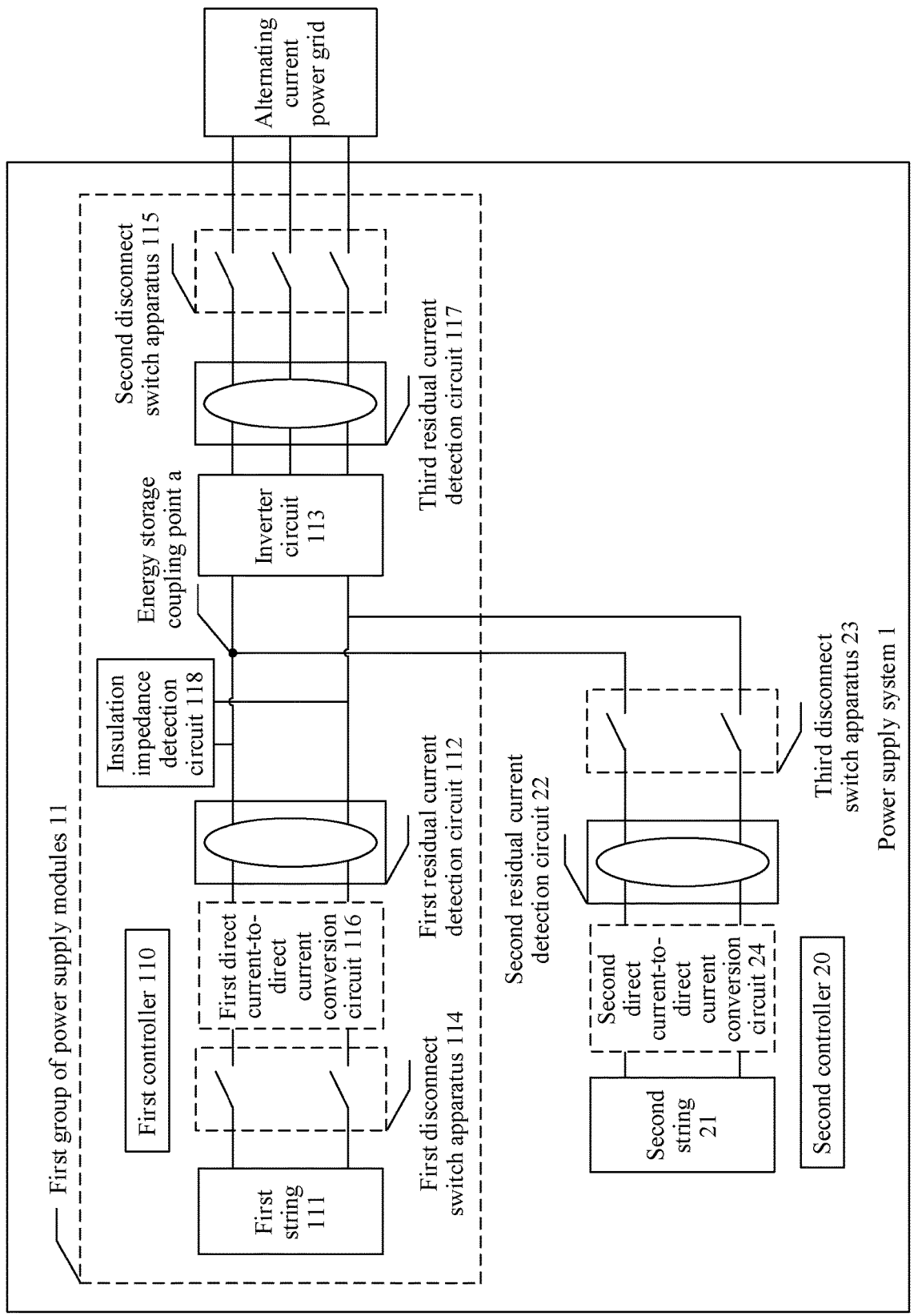
FIG. 7 is another schematic diagram of a structure of a power supply system according to this application.

For example, descriptions are provided below by using an example in which the power supply system includes one group of power supply modules and the insulation impedance detection circuit is disposed between the first direct current-to-direct current conversion circuit and the energy storage coupling point. FIG. 7 is still another schematic diagram of a structure of the power supply system according to this application. As shown in FIG. 7, the first group of power supply modules 11 further includes an insulation impedance detection circuit 118. The insulation impedance detection circuit 118 is connected between the output end of the first direct current-to-direct current conversion circuit 116 and the energy storage coupling point a, and is configured to detect an insulation impedance value at an input end of the insulation impedance detection circuit 118 before the power supply system 1 is powered on or in a running process of the power supply system 1.

Before or during running of the power supply system 1, the insulation impedance detection circuit 118 detects the insulation impedance value at the input end of the insulation impedance detection circuit 118, and sends the insulation impedance value to the first controller 110. The first controller 110 receives the insulation impedance value, and when the insulation impedance value is less than a preset insulation impedance threshold, controls the first string 111 in the power supply module in which the first controller 110 is located to be disconnected from the inverter circuit 113, or controls the inverter circuit 113 to be disconnected from the alternating current power grid.

In an optional embodiment, when the insulation impedance value is less than the preset insulation impedance threshold, the first controller 110 controls the first disconnect switch apparatus 114 to be turned off, so that the first string 111 is disconnected from the first direct current-to-direct current conversion circuit 116, to ensure that the first group of power supply modules 11 no longer works, so as to protect the power supply system 1.

In another optional embodiment, when the insulation impedance value is less than the preset insulation impedance threshold, the first controller 110 controls the second disconnect switch apparatus 115 to be turned off, so that the first group of power supply modules 11 is disconnected from the alternating current power grid, to ensure that the first group of power supply modules 11 no longer works, so as to protect the power supply system 1.

Further, when it is detected that the insulation impedance value is less than the preset insulation impedance threshold, in addition to controlling, in the manners in the foregoing two optional embodiments, the disconnect switch apparatus in the first group of power supply modules 11 to be turned off, the first controller 110 may further report an alarm. Optionally, when the insulation impedance value is less than a first preset insulation impedance threshold, the first controller 110 reports an alarm. When the insulation impedance value is less than a second preset insulation impedance threshold, the first controller 110 reports an alarm, and controls, in the manners in the foregoing two optional embodiments, the disconnect switch apparatus in the first group of power supply modules 11 to be turned off. The first preset insulation impedance threshold is greater than or equal to the second preset insulation impedance threshold.

It should be noted that when circuits in each group of power supply modules are located in a same device, the inverter includes but is not limited to the first controller, the first residual current detection circuit, the first disconnect switch apparatus, the first direct current-to-direct current conversion circuit, the inverter circuit, the second disconnect switch apparatus, and the third residual current detection circuit in each group of power supply modules shown in FIG. 2a to FIG. 7, and the DC/DC converter includes but is not limited to the second controller 20, the second residual current detection circuit 22, the third disconnect switch apparatus 23, and the second direct current-to-direct current conversion circuit 24 shown in FIG. 2a to FIG. 6.

When circuits in each group of power supply modules are not located in a same device, the first controller in each group of power supply modules includes a first subcontroller and a second subcontroller, the first DC/DC converter includes but is not limited to a first subcontroller, the first residual current detection circuit, the first disconnect switch apparatus, the first direct current-to-direct current conversion circuit, and the insulation impedance detection circuit in each group of power supply modules shown in FIG. 2a to FIG. 7, the inverter includes but is not limited to a second subcontroller, the inverter circuit, the second disconnect switch apparatus, and the third residual current detection circuit in each group of power supply modules shown in FIG. 2a to FIG. 7, and the second DC/DC converter includes but is not limited to the second controller 20, the second residual current detection circuit 22, the third disconnect switch apparatus 23, and the second direct current-to-direct current conversion circuit 24 shown in FIG. 2a to FIG. 6.

When the residual current detection circuit and the disconnect switch apparatus that needs to be turned off are not located in a same device, another device may be notified by using a dry contact or through communication, to control the disconnect switch apparatus to be turned off.

Figure 8:
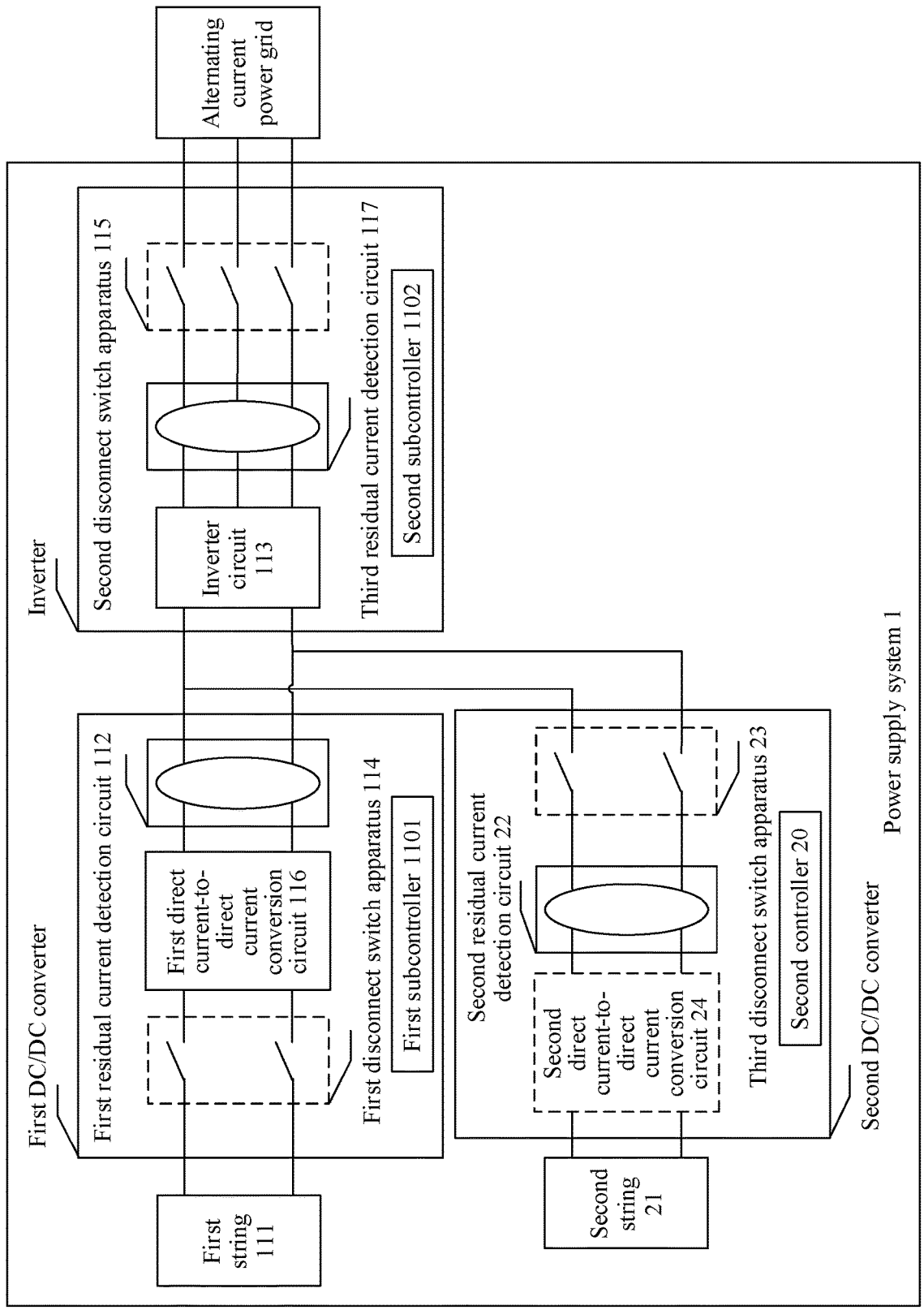
FIG. 8 is still another schematic diagram of a structure of a power supply system according to this application.

For example, descriptions are provided below by using an example in which the power supply system includes one group of power supply modules, and circuits in the power supply modules are not located in a same device. FIG. 8 is another schematic diagram of a structure of a power supply system according to this application. As shown in FIG. 8, the power supply system 1 includes a first string 111, a first DC/DC converter, an inverter, a second string 21, and a second DC/DC converter. The first string 111 is connected to an input end of the first DC/DC converter, the second string 21 is connected to an input end of the second DC/DC converter, an output end of the first DC/DC converter is connected in parallel to an output end of the second DC/DC converter, and then is connected to an input end of the inverter, and an output end of the inverter is connected to an alternating current power grid. The first DC/DC converter includes a first direct current-to-direct current conversion circuit 116, a first disconnect switch apparatus 114, a first residual current detection circuit 112, and a first subcontroller 1101. One end of the first disconnect switch apparatus 114 is connected to the input end of the first DC/DC converter, and an output end of the first direct current-to-direct current conversion circuit 116 is connected to the output end of the first DC/DC converter. The second DC/DC converter includes a second direct current-to-direct current conversion circuit 24, a third disconnect switch apparatus 23, a second residual current detection circuit 22, and a second controller 20. An input end of the second direct current-to-direct current conversion circuit 24 is connected to the input end of the second DC/DC converter, and one end of the third disconnect switch apparatus 23 is connected to the output end of the second DC/DC converter. The inverter includes an inverter circuit 113, a third residual current detection circuit 117, a second disconnect switch apparatus 115, and a second subcontroller 1102. An input end of the inverter circuit 113 is connected to the input end of the inverter, and one end of the second disconnect switch apparatus 115 is connected to the output end of the inverter.

The first string 111 may be a photovoltaic string, and the second string 21 may be an energy storage battery string. For a connection relationship between circuits in the first DC/DC converter, the inverter, and the second DC/DC converter, refer to the descriptions in the foregoing embodiments. Details are not described herein.

In a feasible implementation, when the first DC/DC converter starts to work, the first residual current detection circuit 112 starts to continuously detect a residual current value of the first string 111 and the first direct current-to-direct current conversion circuit 116, and sends the detected residual current value to the first subcontroller 1101. Optionally, the first subcontroller 1101 sends a current detection instruction to the first residual current detection circuit 112 at a preset frequency. The first residual current detection circuit 112 detects the residual current value of the first string 111 and the first direct current-to-direct current conversion circuit 116 according to the received current detection instruction, and returns the residual current value to the first subcontroller 1101. The first residual current detection circuit 112 may alternatively be disposed between the input end of the first DC/DC converter and an input end of the first direct current-to-direct current conversion circuit 116, and is configured to detect the residual current value of the first string 111.

When the received residual current value is greater than a preset residual current threshold, the first subcontroller 1101 controls the first string 111 to be disconnected from the first direct current-to-direct current conversion circuit 116, or triggers the second subcontroller 1102 to control the inverter to be disconnected from the alternating current power grid.

In an optional embodiment, when the residual current value is greater than the preset residual current threshold, the first subcontroller 1101 determines that a branch in which the first string is located is a faulty power supply branch, and controls the first disconnect switch apparatus 114 to be turned off, so that the first string 111 is disconnected from the first direct current-to-direct current conversion circuit 116, to ensure that the faulty power supply branch is disconnected, that is, the first string 111 is disconnected from the first DC/DC converter, so as to protect the power supply system 1.

It should be noted that after a residual current fault disappears, the first disconnect switch apparatus 114 may be turned on after a delay of a specific time (if there are a plurality of delays, a time corresponding to each delay may be changed), to perform device restart detection. If the residual current fault persists after detection is performed for a plurality of times, the first disconnect switch apparatus 114 is controlled to remain off, and the inverter is shut down.

In another optional embodiment, when the residual current value is greater than the preset residual current threshold, the first subcontroller 1101 sends an alternating current switch turn-off instruction to the inverter, and the second subcontroller 1102 in the inverter controls, according to the received alternating current switch turn-off instruction, the second disconnect switch apparatus 115 to be turned off, and controls the inverter circuit 113 to be disconnected from the alternating current power grid, so that the inverter is disconnected from the alternating current power grid, to effectively cut off a faulty power supply branch, so as to protect the power supply system 1.

In addition, before each DC/DC converter is started and an inverter device is connected to the grid, at least one of photovoltaic array insulation impedance detection (Isolation, ISO), direct current residual current device (RCD) self-detection, and energy storage RCD self-detection is usually performed first. If the detection fails, the device is not powered on, and at least one of the first disconnect switch apparatus 114, the second disconnect switch apparatus 115, and the third disconnect switch apparatus 23 is turned off.

In this embodiment of this application, when it is detected that the residual current value is greater than the preset residual current threshold, the first DC/DC converter may control the first disconnect switch apparatus 114 in the first DC/DC converter to be turned off, or send an alternating current switch turn-off instruction to the inverter, so that the second disconnect switch apparatus 115 is turned off, to protect the power supply system 1. The protection manner is flexible and has high applicability.

In another feasible implementation, when the second DC/DC converter starts to work, the second residual current detection circuit 22 starts to detect a residual current value of the first string 111 and the first direct current-to-direct current conversion circuit 116, or obtain a residual current value of the second string 21 and the second direct current-to-direct current conversion circuit 24, and sends the detected residual current value to the second controller 20.

When the received residual current value is greater than a preset residual current threshold, the second controller 20 controls the second string 21 to be disconnected from a first group of power supply modules 11, or triggers the first subcontroller 1101 to control the first string 111 to be disconnected from the first DC/DC converter, and triggers the second subcontroller 1102 to control the inverter to be disconnected from the alternating current power grid.

In an optional embodiment, when the received residual current value is greater than the preset residual current threshold, the second controller 20 controls the third disconnect switch apparatus 23 to be turned off, so that the second string 21 is disconnected from the second DC/DC converter, to effectively cut off a faulty branch in which the second string 21 is located, so as to protect the power supply system 1.

In another optional embodiment, when the received residual current value is greater than the preset residual current threshold, the second controller 20 separately sends a direct current switch turn-off instruction to the first DC/DC converter, and sends an alternating current switch turn-off instruction to the inverter. The first subcontroller 1101 in the first DC/DC converter controls, according to the received direct current switch turn-off instruction, the first disconnect switch apparatus 114 to be turned off, and the second subcontroller 1102 in the inverter controls, according to the received alternating current switch turn-off instruction, the second disconnect switch apparatus 115 to be turned off, to effectively cut off a faulty branch in which the second string 21 is located, so as to protect the power supply system 1.

In this embodiment of this application, when it is detected that the residual current value is greater than the preset residual current threshold, the second DC/DC converter may control the third disconnect switch apparatus 23 in the second DC/DC converter to be turned off, or send an alternating current switch turn-off instruction to the inverter and a direct current switch turn-off instruction to the first DC/DC converter, so that the second disconnect switch apparatus 115 and the first disconnect switch apparatus 114 are turned off, to protect the power supply system 1. The protection manner is flexible and has high applicability.

Figure 9:
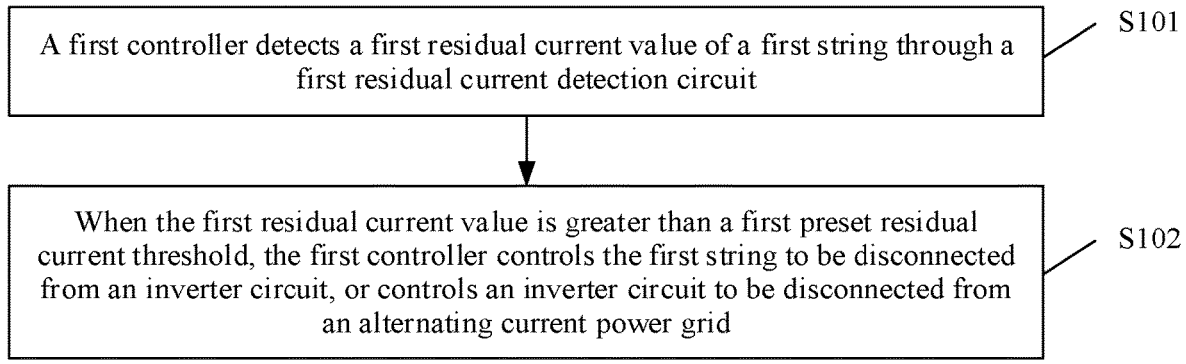
FIG. 9 is a schematic flowchart of a protection method for a power supply system according to this application.

FIG. 9 is a schematic flowchart of a protection method for a power supply system according to this application. The protection method for a power supply system provided in this application is applicable to a first controller (for example, the first controller 110) in any power supply module in the power supply system shown in FIG. 2a to FIG. 8. The method includes the following steps.

S101: The first controller detects a first residual current value of a first string through a first residual current detection circuit.

S102: When the first residual current value is greater than a first preset residual current threshold, the first controller controls the first string to be disconnected from an inverter circuit, or controls an inverter circuit to be disconnected from an alternating current power grid.

Specifically, when the first residual current value detected by the first residual current detection circuit is greater than the first preset residual current threshold, the first controller 110 controls a first disconnect switch apparatus 114 to be turned off, so that the first string 111 is disconnected from the inverter circuit 113, or controls a second disconnect switch apparatus 115 to be turned off, so that the inverter circuit 113 is disconnected from the alternating current power grid, to protect the power supply system 1.

Further, when a first group of power supply modules 11 includes a first direct current-to-direct current conversion circuit 116, the first residual current detection circuit 112 may detect a first residual current value at an output end of the first direct current-to-direct current conversion circuit 116, and send the first residual current value to the first controller 110. When the received first residual current value is greater than the first preset residual current threshold, the first controller 110 controls the first disconnect switch apparatus 114 to be turned off, so that the first string 111 is disconnected from the inverter circuit 113, or controls the second disconnect switch apparatus 115 to be turned off, so that the inverter circuit 113 is disconnected from the alternating current power grid, to protect the power supply system 1.

When the power supply system 1 includes one group of power supply modules, the power supply module further includes a third residual current detection circuit 117. When the power supply system 1 starts to run, the third residual current detection circuit 117 starts to continuously detect a third residual current value at an output end of the inverter circuit 113, and sends the third residual current value to the first controller 110. When the received third residual current value is greater than a third preset residual current threshold, the first controller 110 controls the second disconnect switch apparatus 115 to be turned off, so that the inverter circuit 113 is disconnected from the alternating current power grid, or controls the first disconnect switch apparatus 114 to be turned off, so that the first string 111 is disconnected from the inverter circuit 113.

When the first group of power supply modules 11 further includes an insulation impedance detection circuit 118, before or during running of the power supply system 1, the insulation impedance detection circuit 118 detects an insulation impedance value at an input end of the inverter circuit 113, and sends the detected insulation impedance to the first controller 110. When the received insulation impedance value is less than a preset insulation impedance threshold, the first controller 110 controls the first disconnect switch apparatus 114 to be turned off, so that the first string 111 is disconnected from the inverter circuit 113, or controls the second disconnect switch apparatus 15 to be turned off, so that the inverter circuit 113 is disconnected from the alternating current power grid.

In specific implementation, for more operations performed by the first controller in the protection method for a power supply system provided in this application, refer to the power supply system shown in FIG. 2a to FIG. 8 and the implementations performed by the first controller in the working principle of the power supply system. Details are not described herein.

In this embodiment of this application, when it is detected that a residual current value received by a first controller in each group of power supply modules is greater than a preset residual current threshold, the first controller in each group of power supply modules determines that the power supply module in which the first controller is located has a leakage risk, and controls a first string in the power supply module in which the first controller is located to be disconnected from an inverter circuit, or an inverter circuit to be disconnected from the alternating current power grid, to effectively cut off the power supply module that has a leakage risk in the power supply system, so as to protect the power supply system. There are diversified protection manners, flexibility is high, and applicability is high.

Figure 10:
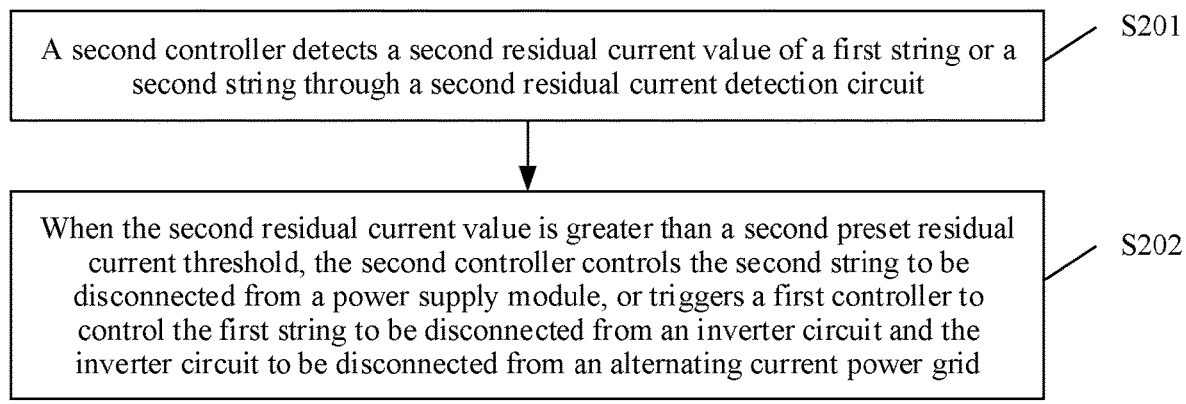
FIG. 10 is another schematic flowchart of a protection method for a power supply system according to this application.

FIG. 10 is another schematic flowchart of a protection method for a power supply system according to this application. The protection method for a power supply system provided in this application is applicable to the second controller 20 in the power supply system shown in FIG. 2a to FIG. 8. The method includes the following steps.

S201: The second controller detects a second residual current value of a first string or a second string through a second residual current detection circuit.

S202: When the second residual current value is greater than a second preset residual current threshold, the second controller controls the second string to be disconnected from a power supply module, or triggers a first controller to control the first string to be disconnected from an inverter circuit and the inverter circuit to be disconnected from an alternating current power grid.

Specifically, when the second residual current value detected by the second residual current detection circuit is greater than the second preset residual current threshold, the second controller 20 controls the second string 21 to be disconnected from each group of power supply modules, or triggers a first controller in each group of power supply modules to control a first string in each group of power supply modules to be disconnected from an inverter circuit and the inverter circuit to be disconnected from the alternating current power grid.

In an optional embodiment, when the power supply system 1 further includes a third disconnect switch apparatus 23, the second controller 20 controls the third disconnect switch apparatus 23 to be turned off, to disconnect the second string 21 from each group of power supply modules. Further, when the power supply system 1 further includes a second direct current-to-direct current conversion circuit 24, and when the second residual current value is greater than the second preset residual current threshold, and an output voltage value of the second direct current-to-direct current conversion circuit 24 is not less than a preset output voltage threshold, the second controller 20 controls the third disconnect switch apparatus 23 to be turned off; and when the second residual current value is greater than the second preset residual current threshold, and the output voltage value of the second direct current-to-direct current conversion circuit 24 is less than the preset output voltage threshold, controls the second direct current-to-direct current conversion circuit 24 to stop outputting.

In another optional embodiment, when the second residual current value detected by the second residual current detection circuit is greater than the second preset residual current threshold, the second controller 20 sends an alternating/direct current switch turn-off instruction to the first controller in each group of power supply modules. The first controller in each group of power supply modules controls, according to the received alternating/direct current switch turn-off instruction, the first string in the power supply module in which the first controller is located to be disconnected from the inverter circuit and the inverter circuit to be disconnected from the alternating current power grid.

In specific implementation, for more operations performed by the second controller in the protection method for a power supply system provided in this application, refer to the power supply system shown in FIG. 2a to FIG. 8 and the implementations performed by the second controller in the working principle of the power supply system. Details are not described herein.

In this embodiment of this application, when it is detected that the residual current value detected by the second residual current detection circuit is greater than the preset residual current threshold, the second controller determines that a power supply branch in which the second string 21 is located has a leakage risk, and controls the second string 21 to be disconnected from each group of power supply modules, or triggers the first controller in each group of power supply modules to control the first string to be disconnected from the inverter circuit and the inverter circuit to be disconnected from the alternating current power grid, to effectively cut off the power supply branch that has a leakage risk in the power supply system, so as to protect the power supply system. There are diversified protection manners, flexibility is high, and applicability is high.

Figure 11:
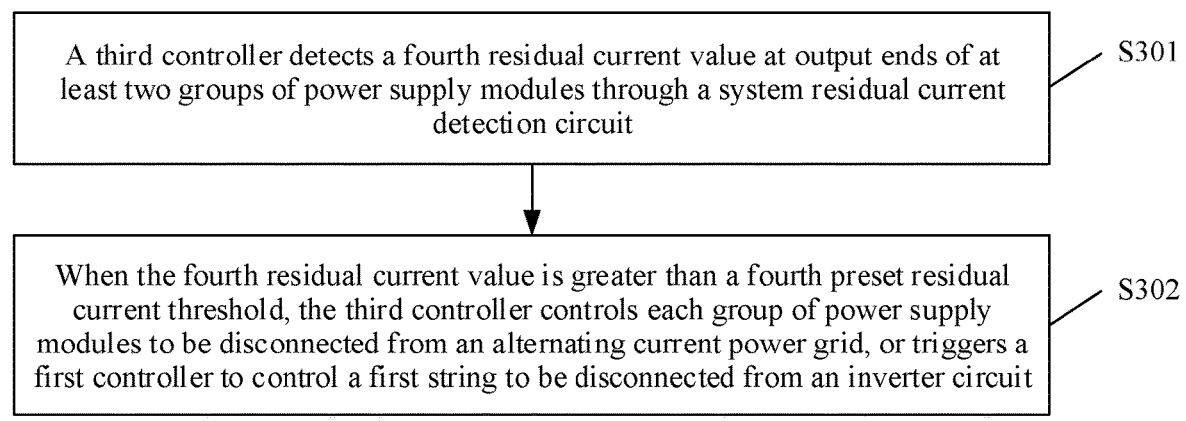
FIG. 11 is still another schematic flowchart of a protection method for a power supply system according to this application.

FIG. 11 is still another schematic flowchart of a protection method for a power supply system according to this application. The protection method for a power supply system provided in this application is applicable to the third controller 30 in the power supply system shown in FIG. 2a to FIG. 8. The method includes the following steps.

S301: The third controller detects a fourth residual current value at output ends of at least two groups of power supply modules through a system residual current detection circuit.

S302: When the fourth residual current value is greater than a fourth preset residual current threshold, the third controller controls each group of power supply modules to be disconnected from an alternating current power grid, or triggers a first controller to control a first string to be disconnected from an inverter circuit.

Specifically, when the received fourth residual current value is greater than the fourth preset residual current threshold, the third controller 30 controls each group of power supply modules to be disconnected from the alternating current power grid, or triggers a first controller in each group of power supply modules to control a first string in the power supply module in which the first controller is located to be disconnected from an inverter circuit, to effectively avoid a case in which in an existing solution, due to a cross current generated between at least two inverter circuits, there is detection difficulty for a residual current detection circuit located at an output end of the inverter circuit, and consequently a power supply system cannot be effectively protected.

In an optional embodiment, the power supply system 1 further includes a system disconnect switch apparatus 32. When the fourth residual current value is greater than the fourth preset residual current threshold, the third controller 30 controls the system disconnect switch apparatus 32 to be turned off, so that each group of power supply modules is disconnected from the alternating current power grid, to ensure that there is no residual current in the system residual current detection circuit 31, so as to protect the power supply system 1.

In another optional embodiment, when each group of power supply modules includes a second disconnect switch apparatus, if the fourth residual current value is greater than the fourth preset residual current threshold, the third controller 30 sends an alternating current switch turn-off instruction to the first controller in each group of power supply modules. The first controller in each group of power supply modules controls, according to the received alternating current switch turn-off instruction, the second disconnect switch apparatus in the power supply module in which the first controller is located to be turned off, so that each group of power supply modules is disconnected from the alternating current power grid, to ensure that there is no residual current in the system residual current detection circuit 31, so as to protect the power supply system 1.

In another optional embodiment, when each group of power supply modules includes a first disconnect switch apparatus, and the power supply system 1 does not include a second string 21, if the fourth residual current value is greater than the fourth preset residual current threshold, the third controller 30 sends a direct current switch turn-off instruction to the first controller in each group of power supply modules. The first controller in each group of power supply modules controls, according to the received direct current switch turn-off instruction, the first disconnect switch apparatus in the power supply module in which the first controller is located to be turned off, so that the first string in each group of power supply modules is disconnected from a first direct current-to-direct current conversion circuit, to ensure that there is no current in each circuit in the power supply system 1, so as to protect the power supply system 1, and improve safety of a worker during maintenance of the power supply system 1.

In another optional embodiment, when the power supply system 1 includes a second string 21 and a system disconnect switch apparatus 32, and each group of power supply modules includes a first disconnect switch apparatus 114 and a second disconnect switch apparatus 115, if the fourth residual current value is greater than the fourth preset residual current threshold, the third controller 30 controls the system disconnect switch apparatus 32 to be turned off, so that the power supply system 1 is disconnected from the alternating current power grid, and sends an alternating/direct current switch turn-off instruction to the first controller in each group of power supply modules. The first controller in each group of power supply modules controls, according to the received alternating/direct current switch turn-off instruction, both the first disconnect switch apparatus and the second disconnect switch apparatus in the power supply module in which the first controller is located to be turned off, so that there is no current in each circuit in each group of power supply modules, to protect the power supply system 1, and improve safety of a worker during maintenance of the power supply system 1.

In still another optional embodiment, when the power supply system 1 includes a second string 21 and a third disconnect switch apparatus 23, and each power supply module includes a first disconnect switch apparatus, if the fourth residual current value is greater than the fourth preset residual current threshold, the third controller 30 sends a direct current switch turn-off instruction to the first controller in each group of power supply modules, and sends an energy storage turn-off instruction to a second controller 20. The first controller in each group of power supply modules controls, according to the received direct current switch turn-off instruction, the first disconnect switch apparatus in the power supply module in which the first controller is located to be turned off, so that the first string in each group of power supply modules is disconnected from a first direct current-to-direct current conversion circuit. The second controller 20 controls, according to the received energy storage turn-off instruction, the third disconnect switch apparatus 23 to be turned off. In this way, it can be ensured that there is no residual current in the system residual current detection circuit 31, and it is ensured that there is no current in each circuit in the power supply system 1, to protect the power supply system 1, and improve safety of a worker during maintenance of the power supply system 1 to protect the power supply system 1.

In specific implementation, for more operations performed by the third controller in the protection method for a power supply system provided in this application, refer to the power supply system shown in FIG. 2a to FIG. 8 and the implementations performed by the third controller in the working principle of the power supply system. Details are not described herein.

In this embodiment of this application, when it is detected that the residual current value detected by the system residual current detection circuit is greater than the preset residual current threshold, the third controller determines that a power supply loop in which the system residual current detection circuit is located has a leakage risk, and controls each group of power supply modules to be disconnected from the alternating current power grid, or triggers the first controller in each group of power supply modules to control the first string in the power supply module in which the first controller is located to be disconnected from the inverter circuit, to effectively cut off the power supply loop that has a leakage risk in the power supply system, so as to protect the power supply system. There are diversified protection manners, flexibility is high, and applicability is high.

It should be noted that the first controller, the second controller, and the third controller in this application may alternatively be a same controller. This is not limited in this application.

In this application, when the detected residual current value is greater than the preset residual current threshold, the power supply system may be protected in a plurality of manners. The protection manner is flexible and has high applicability.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power supply system, wherein the power supply system comprises:
   at least one group of power supply modules, a power supply module of the at least one group of power supply modules comprises a first string, a first residual current detection circuit, an inverter circuit, and a first controller, the first residual current detection circuit is connected between the first string and an input end of the inverter circuit, and an output end of the inverter circuit is connected to an alternating current (AC) power grid;
   the first residual current detection circuit is configured to:
      detect a first residual current value of the first string; and
   the first controller is configured to:
      when the first residual current detection circuit detects that the first residual current value is greater than a first preset residual current threshold, control the first string to be disconnected from the inverter circuit, or control the inverter circuit to be disconnected from the AC power grid, to protect the power supply system;
   wherein the power supply system further comprises a second string, a second residual current detection circuit, and a second controller, and wherein the second residual current detection circuit is connected between the second string and the input end of the inverter circuit;
   wherein the second residual current detection circuit is configured to:
      detect a second residual current value of the first string or the second string; and
   the second controller is configured to:
      when the second residual current detection circuit detects that the second residual current value is greater than a second preset residual current threshold, control the second string to be disconnected from the power supply module, or trigger the first controller to control the first string to be disconnected from the inverter circuit and the inverter circuit to be disconnected from the AC power grid.

2. The power supply system according to claim 1,
   wherein the power supply module further comprises a first direct current (DC)-to-DC conversion circuit, and the first string is connected to the input end of the inverter circuit by using the first DC-to-DC conversion circuit; and
   wherein the first residual current detection circuit is further configured to:
   detect the first residual current value at an output end of the first DC-to-DC conversion circuit.

3. The power supply system according to claim 1,
   wherein when the power supply system comprises one group of power supply modules, the power supply module further comprises a third residual current detection circuit;
   wherein the third residual current detection circuit is configured to
      detect a third residual current value at the output end of the inverter circuit; and
   wherein the first controller is further configured to:
      when the third residual current detection circuit detects that the third residual current value is greater than a third preset residual current threshold, control the inverter circuit to be disconnected from the AC power grid, or control the first string to be disconnected from the inverter circuit.

4. The power supply system according to claim 1,
   wherein, when the power supply system comprises at least two groups of power supply modules, the power supply system further comprises a system residual current detection circuit and a third controller, and the system residual current detection circuit is connected between output ends of the at least two groups of power supply modules and the AC power grid;
   wherein the system residual current detection circuit is configured to:
      detect a fourth residual current value at the output ends of the at least two groups of power supply modules; and
   wherein the third controller is configured to:
      when the system residual current detection circuit detects that the fourth residual current value is greater than a fourth preset residual current threshold, control each group of the at least two groups of power supply modules to be disconnected from the AC power grid, or trigger the first controller to control the first string to be disconnected from the inverter circuit.

5. The power supply system according to claim 1,
   wherein the power supply module further comprises an insulation impedance detection circuit, and the insulation impedance detection circuit is connected between the first string and the input end of the inverter circuit;

wherein the insulation impedance detection circuit is configured to:
  detect an insulation impedance value at the input end of the inverter circuit; and
wherein the first controller is further configured to:
  when the insulation impedance detection circuit detects that the insulation impedance value is less than a preset insulation impedance threshold, control the first string to be disconnected from the inverter circuit, or control the inverter circuit to be disconnected from the AC power grid.

6. The power supply system according to claim 1,
wherein the first controller comprises a first subcontroller and a second subcontroller; and
wherein the first subcontroller is configured to:
  control the first string to be disconnected from the inverter circuit, or trigger the second subcontroller to control the inverter circuit to be disconnected from the AC power grid.

7. The power supply system according to claim 1,
wherein the power supply module further comprises a disconnect switch apparatus, and the first string is connected to the input end of the inverter circuit by using the disconnect switch apparatus; and
wherein the first controller is configured to control the disconnect switch apparatus to be turned off, to control the first string to be disconnected from the inverter circuit.

8. The power supply system according to claim 1,
wherein the power supply module further comprises a disconnect switch apparatus, and the disconnect switch apparatus is connected to the output end of the inverter circuit; and
wherein the first controller is configured to:
  control the disconnect switch apparatus to be turned off, to control the inverter circuit to be disconnected from the AC power grid.

9. The power supply system according to claim 1,
wherein the power supply system further comprises a disconnect switch apparatus, and the second string is connected to the input end of the inverter circuit by using the disconnect switch apparatus; and
wherein the second controller is configured to:
  control the disconnect switch apparatus to be turned off, to control the second string to be disconnected from the power supply module.

10. The power supply system according to claim 9,
wherein the power supply system further comprises a DC-to-DC conversion circuit, an input end of the DC-to-DC conversion circuit is connected to the second string, and an output end of the DC-to-DC conversion circuit is connected to the disconnect switch apparatus;
wherein the second controller is configured to:
  when the second residual current value is greater than the second preset residual current threshold, and an output voltage value of the DC-to-DC conversion circuit is greater than or equal to a preset output voltage threshold, control the disconnect switch apparatus to be turned off; and
wherein the second controller is further configured to:
  when the second residual current value is greater than the second preset residual current threshold, and the output voltage value of the DC-to-DC conversion circuit is less than the preset output voltage threshold, control the DC-to-DC conversion circuit to stop outputting.

11. The power supply system according to claim 4,
wherein the power supply system further comprises a system disconnect switch apparatus, and the output ends of the at least two groups of power supply modules are connected to the AC power grid by using the system disconnect switch apparatus; and
wherein the third controller is configured to:
  control the system disconnect switch apparatus to be turned off, to control each group of the at least one group of power supply modules to be disconnected from the AC power grid.

12. A method, wherein the method comprises:
detecting, by a first controller, a first residual current value of a first string through a first residual current detection circuit; and
when the first residual current detection circuit detects that the first residual current value is greater than a first preset residual current threshold, controlling, by the first controller, the first string to be disconnected from an inverter circuit, or controlling the inverter circuit to be disconnected from an alternating current (AC) power grid, to protect a power supply system;
detecting, by a second controller, a second residual current value of the first string or a second string through a second residual current detection circuit; and
when the second residual current detection circuit detects that the second residual current value is greater than a second preset residual current threshold, controlling, by the second controller, the second string to be disconnected from a power supply module, or triggering the first controller to control the first string to be disconnected from the inverter circuit and the inverter circuit to be disconnected from the AC power grid.

13. The method according to claim 12, wherein the method further comprises:
detecting, by the first controller, the first residual current value at an output end of a first direct current (DC)-to-DC conversion circuit through the first residual current detection circuit.

14. The method according to claim 12, wherein the method further comprises:
detecting, by the first controller, a third residual current value at an output end of the inverter circuit through a third residual current detection circuit; and
when the third residual current detection circuit detects that the third residual current value is greater than a third preset residual current threshold, controlling, by the first controller, the inverter circuit to be disconnected from the AC power grid, or controlling the first string to be disconnected from the inverter circuit.

15. The method according to claim 12, wherein the method further comprises:
detecting, by the first controller, an insulation impedance value at an input end of the inverter circuit through an insulation impedance detection circuit; and
when the insulation impedance detection circuit detects that the insulation impedance value is less than a preset insulation impedance threshold, controlling, by the first controller, the first string to be disconnected from the inverter circuit, or controlling the inverter circuit to be disconnected from the AC power grid.

16. A direct current (DC)/DC converter, wherein the DC/DC converter comprises:
a DC-to-DC conversion circuit, a DC residual current detection circuit, and a controller, wherein an input end of the DC-to-DC conversion circuit is connected to a photovoltaic string, and an output end of the DC-to-DC conversion circuit is connected to an alternating current (AC) power grid by using an inverter;

the DC residual current detection circuit is configured to:
- detect a residual current value, the residual current value being of the photovoltaic string or being of the photovoltaic string and the DC-to-DC conversion circuit; and the controller is configured to:
- control the photovoltaic string to be disconnected from the DC-to-DC conversion circuit, or trigger the inverter to be disconnected from the AC power grid, based on the residual current value.

17. The DC/DC converter according to claim 16,
wherein the DC/DC converter further comprises a DC disconnect switch apparatus, and the DC disconnect switch apparatus is connected to the input end of the DC-to-DC conversion circuit; and
wherein the controller is configured to:
- when the residual current value is greater than a preset residual current threshold, control the DC disconnect switch apparatus to be turned off, to control the photovoltaic string to be disconnected from the DC-to-DC conversion circuit.

18. The DC/DC converter according to claim 16,
wherein the inverter comprises an AC disconnect switch apparatus, and the AC disconnect switch apparatus is connected to an output end of the inverter; and
wherein the controller is configured to: when the residual current value is greater than a preset residual current threshold, send an AC switch turn-off instruction to the inverter, wherein the AC switch turn-off instruction is used by the inverter to control the AC disconnect switch apparatus to be turned off, to trigger the inverter to be disconnected from the AC power grid.

19. The DC/DC converter according to claim 16, wherein, when the DC residual current detection circuit is connected between the photovoltaic string and the input end of the DC-to-DC conversion circuit, the DC residual current detection circuit is configured to:
- detect the residual current value of the photovoltaic string.

* * * * *